US012805425B2

(12) United States Patent
Gray et al.

(10) Patent No.: US 12,805,425 B2
(45) Date of Patent: Nov. 24, 2026

(54) METER MODULE FOR METERING A PRODUCT

(71) Applicant: Precision Planting LLC, Tremont, IL (US)

(72) Inventors: Tanner Gray, Green Valley, IL (US); William Frank, Manito, IL (US); Chad E. Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 238 days.

(21) Appl. No.: 18/691,197

(22) PCT Filed: Jul. 20, 2022

(86) PCT No.: PCT/IB2022/056688

§ 371 (c)(1),
(2) Date: Mar. 12, 2024

(87) PCT Pub. No.: WO2023/089383

PCT Pub. Date: May 25, 2023

(65) Prior Publication Data

US 2024/0397853 A1 Dec. 5, 2024

Related U.S. Application Data

(60) Provisional application No. 63/264,430, filed on Nov. 22, 2021.

(51) Int. Cl.
*A01C 7/10* (2006.01)
*A01C 7/12* (2006.01)

(52) U.S. Cl.
CPC .............. *A01C 7/105* (2013.01); *A01C 7/127* (2013.01); *A01C 7/107* (2013.01)

(58) Field of Classification Search
CPC .......... A01C 7/105; A01C 7/107; A01C 7/127
See application file for complete search history.

(56) References Cited

U.S. PATENT DOCUMENTS 7,152,540 B1 12/2006 Sauder et al.
9,699,958 B2 7/2017 Koch et al.
(Continued)

FOREIGN PATENT DOCUMENTS

DE 10037713 A1 2/2002
DE 102019000047 A1 7/2020
EP 2862430 A1 * 4/2015 ............. A01C 7/081

OTHER PUBLICATIONS

European Patent Office, International Search Report related to International Patent Application No. PCT/IB2022/056688, mail date 301 Oct. 2022, 12 pages.

*Primary Examiner* — Matthew R Buck

(57) ABSTRACT

A meter module (200A, 200B, 200) for metering a product in communication with the meter module (200A, 200B, 200). The meter module (200A, 200B, 200) includes a meter housing portion (203) and a lower chamber portion (205), the meter housing portion (203) having a top opening (204) through which the product enters the meter housing portion (203). A metering mechanism is disposed in the meter housing portion (203) and is driven by an electric motor (216). As the metering mechanism is driven, the metering mechanism meters the product into the lower chamber portion (205), the metered product exits the lower chamber portion (205) through a bottom opening (158, 208) in the lower chamber portion (205). The lower chamber portion (205) may include a flow sensor and/or internal structure (260) to capture and weigh the metered product before exiting through the bottom opening (158, 208).

17 Claims, 29 Drawing Sheets

(56) References Cited

U.S. PATENT DOCUMENTS

| | | | | |
|---|---|---|---|---|
| 9,924,627 | B1 * | 3/2018 | Beaujot | G01F 13/001 |
| 11,516,957 | B2 | 12/2022 | Baurer et al. | |
| 2011/0179984 | A1 * | 7/2011 | Beaujot | A01C 7/081<br>406/79 |
| 2012/0174844 | A1 * | 7/2012 | Friggstad | A01C 7/125<br>111/178 |
| 2017/0156259 | A1 * | 6/2017 | Barsi | A01C 7/084 |
| 2020/0037495 | A1 * | 2/2020 | Klein | A01C 7/081 |
| 2022/0155214 | A1 | 5/2022 | Plattner et al. | |

* cited by examiner (center passage closed)
(outer passages open)

(center passage open)
(outer passages closed)

METER MODULE FOR METERING A PRODUCT

CROSS-REFERENCE TO RELATED APPLICATIONS

This application is a national phase entry under 35 U.S.C. § 371 of International Patent Application PCT/IB2022/056688 filed Jul. 20, 2022, designating the United States of America and published in English as International Patent Publication WO 2023/089383 A1 on May 25, 2023, which claims priority to U.S. Provisional Application No. 63/264,430, filed 22 Nov. 2022, the contents of which is incorporated herein by reference in its entirety.

BACKGROUND

Air commodity carts, also commonly referred to as air carts or simply carts, are used to supply seed and fertilizer to air seeders, planters, strip tillers and other applicator implements towed behind or forward of the air cart. Air carts have a wheeled frame which supports one or more large tanks or hoppers. Each tank typically holds one type of product (e.g., a seed type or seed variety, nitrogen, phosphorous, potash, etc.) which is metered by a metering system below the tanks into air tubes. A separate metering system is typically disposed below each tank on the air cart so that each metering system meters out one type of product from each tank. An air stream through the air tubes is produced by a blower or fan typically supported on the air cart. The air stream carries the metered product through the air tubes and into distribution lines which deliver the product to the row units of the applicator implement.

The metering system for most air carts is constructed as one long assembly extending across the width of the air cart. The metering mechanism for most commercially available metering systems utilize long fluted metering rolls that extend through the meter assembly housing and rotate about an axis that is perpendicular to the forward direction of travel of the air cart. Different fluted metering rolls are typically needed for different types of seed and fertilizer depending on the seed size or granular size and the application rate at which the product is to be applied. It is not uncommon for air carts to require four or more different fluted metering rolls to accommodate all seed and granular sizes and application rates. These fluted metering rolls are expensive. Additionally, due to the corrosive nature of fertilizer, the life of most commercially available metering systems is typically around five years, and during that five year life, one or more of the components of the metering system will need repair or replacement.

Accordingly, it would be desirable to provide a metering system that is modular so that the entire metering system for each tank does not need to be replaced if one area of the metering system becomes corroded or fails. A modular metering system would allow the repair or replacement of the single module instead of the entire metering system for the associated tank. It would also be desirable to provide a metering system that requires only one or two metering mechanisms for metering all types of seeds and granular sizes rather than requiring four or more metering mechanisms. It would also be desirable to utilize a metering mechanism within the metering system that is less expensive to produce and is therefore less expensive to repair and replace.

There is also a need for a metering system that is easier and more efficient to calibrate. Most commercially available metering systems are slow and labor intensive to calibrate. For example a common method of calibrating commercially available metering systems on air carts involves the following steps: (1) manually opening the meter assembly to expose the meter rolls; (2) physically attaching collection bag below the open meter assembly; (3) manually rotating the meter rolls several turns (e.g., 10 to 15 turns) to discharge a large quantity of product (which may exceed 20 pounds of product) into the collection bags; (4) physically removing the filled collection bags from the meter assembly; (5) carrying the filled collection bags to a scale disposed on the air cart; (6) physically lifting and attaching the collection bags onto the scale; (7) manually reading the scale; (8) manually looking up on a printed chart the weight of the collected sample for the applicable product, and then cross-referencing the desired application rate and the desired ground speed to determine the proper meter speed setting to achieve the desired application rate; (9) climbing into the cab of the tractor to adjust the controller to the proper meter speed setting based on the chart; (10) climbing out of the tractor; (11) physically lifting and detaching the filled collection bags from the scale; (12) climbing up onto the air cart with the filled collection bags; (13) removing the tank lid; (14) lifting the filled bags and dumping the collected product sample back into the tank; (15) closing the tank lid; (16) climbing back down from the air cart with the empty collection bags; and (17) then finally climbing back into the tractor to begin field application operations with the proper calibration.

Accordingly, there is a need for a more efficient means of calibrating a metering system to achieve a desired application rate.

DESCRIPTION

All references cited herein are incorporated herein in their entireties. If there is a conflict between a definition herein and in an incorporated reference, the definition herein shall control.

Figure 1:
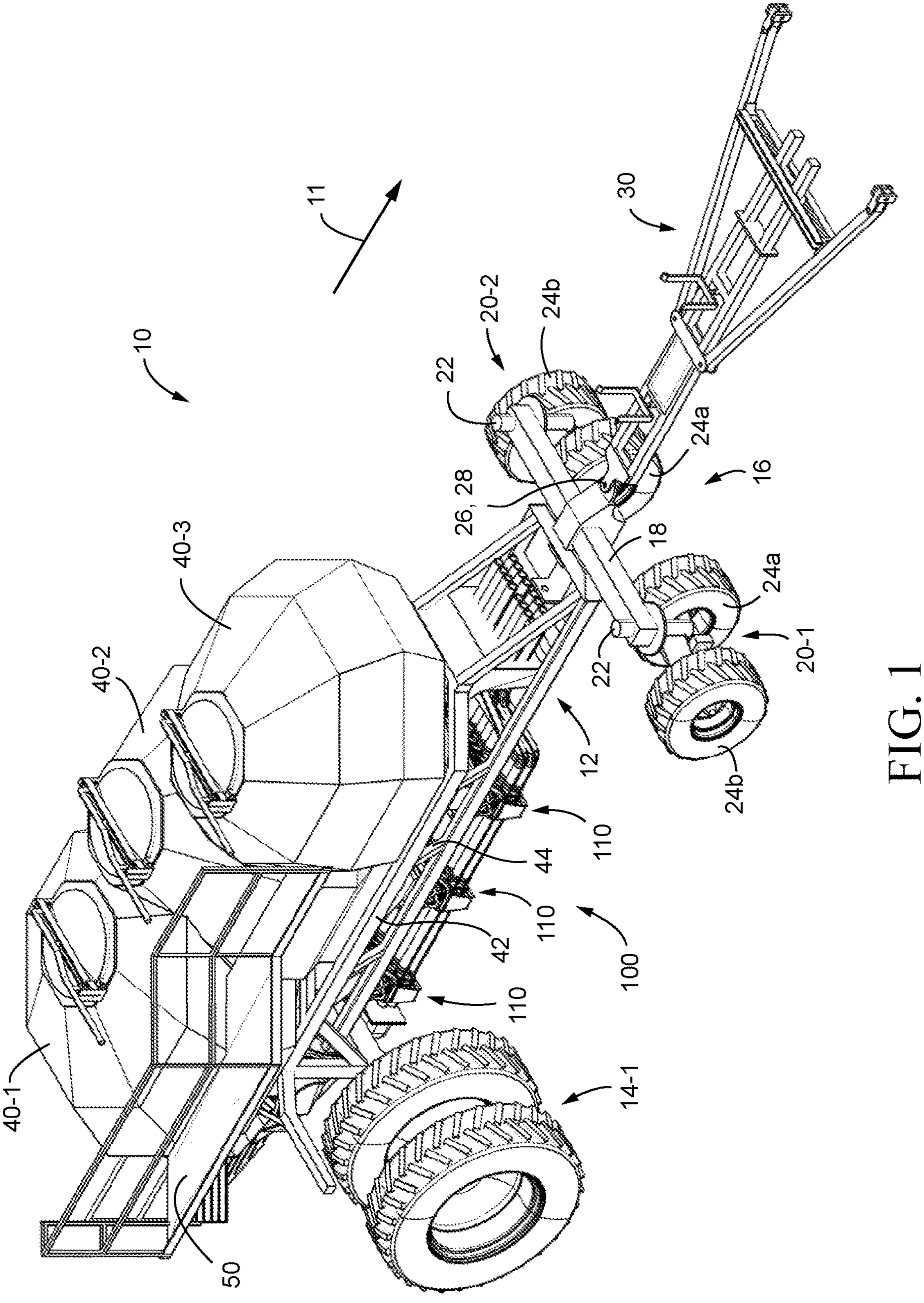
FIG. 1 is a front perspective view of an embodiment of an cart incorporating an embodiment of a modular metering system.
Figure 2:
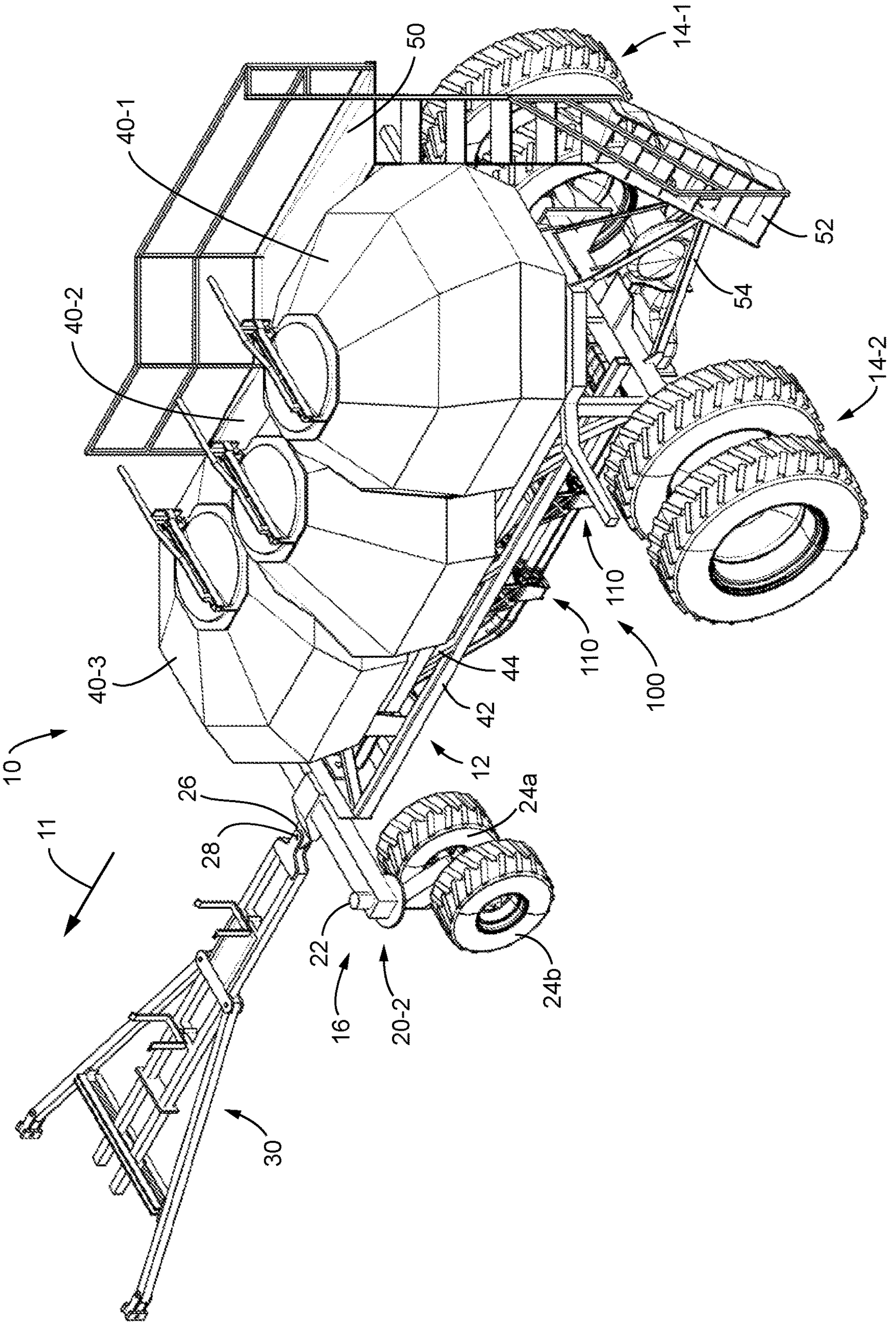
FIG. 2 is a rear perspective view of the air cart of FIG. 1.

Referring to the drawings wherein like reference numerals designate the same or corresponding parts throughout the several drawing views, FIGS. 1 and 2 are front and rear perspective views, respectively, of an embodiment of an air commodity cart 10. The cart 10 is configured to deliver seed, fertilizer or other field or crop inputs to an air seeder, planter, strip tiller or any other field working implement, hereinafter referred to individually and collectively as an "applicator implement" designated generally by reference number 1 in FIG. 3. The embodiment of the air cart 10 is configured to be towed behind the applicator implement 1, which is towed by tractor 2 in a forward direction of travel indicated by arrow 11. Alternatively, the air cart 10 may be towed directly behind the tractor 2 with the applicator implement 1 trailing the air cart 10.

In reference to FIGS. 3, 28 and 29 and as more fully described later, a control system 500 provides operational control and monitoring of the various components of the air cart 10 and the applicator implement 1 so as to control the type and location of the product dispensed and product application rates based on field prescription maps and operator inputs. The control system 500 includes a controller 510 which may be in signal communication with the various operational and monitoring components of the air cart 10 and the applicator implement 1 as described later. The controller 510 may also be in signal communication with a display device 530, a global position system (GPS) 566, a speed sensor 568, and a communication module 520, all discussed later.

Air Cart and Modular Metering System

The air cart 10 includes a modular metering system 100 which is the primary focus of this disclosure. The modular metering system 100 may be adapted for use as a retrofit of virtually any existing or commercially available air cart or the modular metering system 100 may be incorporated as part of an original equipment air cart. Thus, while an exemplary embodiment of an cart 10 is shown in the drawing figures and described below, it should be understood that the modular metering system 100 is not limited to any particular air cart configuration.

The cart 10 includes a main frame 12 supported at a rearward end by left and right rear wheel assemblies 14-1, 14-2 rigidly attached to the main frame 12. A front wheel assembly 16 is rigidly attached to a forward end of the main frame 12. The front wheel assembly 16 includes a horizontal front beam 18 extending transverse to the forward direction of travel 11. Outward lateral ends of the horizontal front beam 18 support left and right front castor wheel assemblies 20-1, 20-2. Each front castor wheel assembly 20-1, 20-2 includes a vertical post 22 pivotally attached at its upper end to the horizontal front beam 18. A lower end of the vertical post 22 supports a pair of longitudinally offset wheels 24*a*, 24*b*. A hitch 26 is disposed in the middle of the horizontal front beam 18 along the longitudinal axis of the main frame 12. The hitch 26 is configured to pivotally attached via a pin 28 to a tow frame 30 that mounts to the rear of the applicator implement 1. It should be appreciated that during operation, as the tractor and applicator implement 1 turns, the tow frame 30 attached to the rear of the applicator implement 1 will pull the cart 10 in the direction of the turn, causing the castor wheel assemblies 22-1, 22-2 to pivot about their respective vertical posts 24 in the direction of the turn such that the air cart 10 will turn and trail behind the applicator implement 1.

The main frame 12 supports one or more tanks or hoppers 40. In this embodiment, three tanks (40-1, 40-2, 40-3) are shown. The tanks 40 may hold one or more seed types or seed varieties, fertilizer or other crop or field inputs for distribution via an air stream to the row units of the applicator implement as described later. The tanks 40 are supported by intermediate tank frame members 42 connected by a plurality of struts 44 to the main frame 12. A platform 50 with a rear access ladder 52 (FIG. 2) may be provided for ease of access to the tank lids or hatches for filling and inspecting the tanks 40. The platform 50 and ladder 52 is supported from the main frame 12 or tank frame 42 by intermediate structural support members 54.

It should be appreciated that the above described air cart 10 is but one exemplary embodiment. In alternative embodiments, the air cart 10 may have only one axle and may be directly connected to the applicator implement without the use of an intermediate tow frame 30. Alternatively, the air cart 10 may have a rear axle as shown, but instead of front wheel assembly with castor wheels as shown, the front wheel assembly may have a front pivoting axle connecting directly to the applicator implement by a draw bar. Additionally, the air cart 10 may have one tank, two tanks, three tanks or four or more tanks depending on the crop or field inputs being applied and the tank capacities desired.

Figure 4:
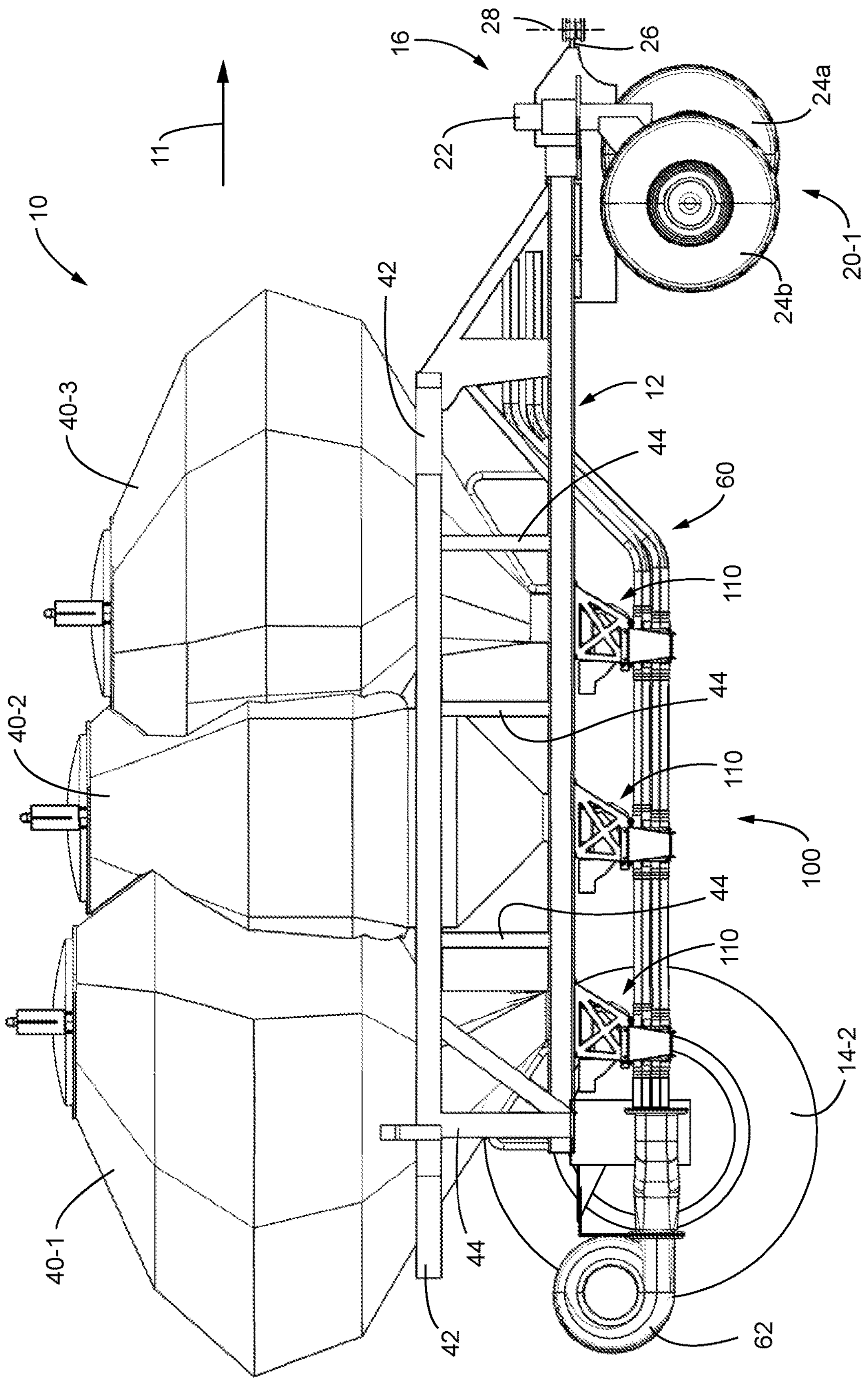
FIG. 4 is an enlarged side elevation view of the cart of FIG. 1 with one of the rear wheel assemblies removed and the platform an intermediate platform support structure removed to better show an embodiment of the air system and modular metering system.

FIG. 4 is an enlarged side elevation view of the air cart 10 with the left rear wheel assembly 14-1 removed along with the platform, ladder and intermediate structural support members to better show an embodiment of the air system 60 and the modular metering system 100. In the embodiment illustrated, the modular metering system 100 includes one or more metering banks 110-1, 110-2, 110-3 each disposed below a respective one of the tanks 40-1, 40-2, 40-3.

Figure 5:
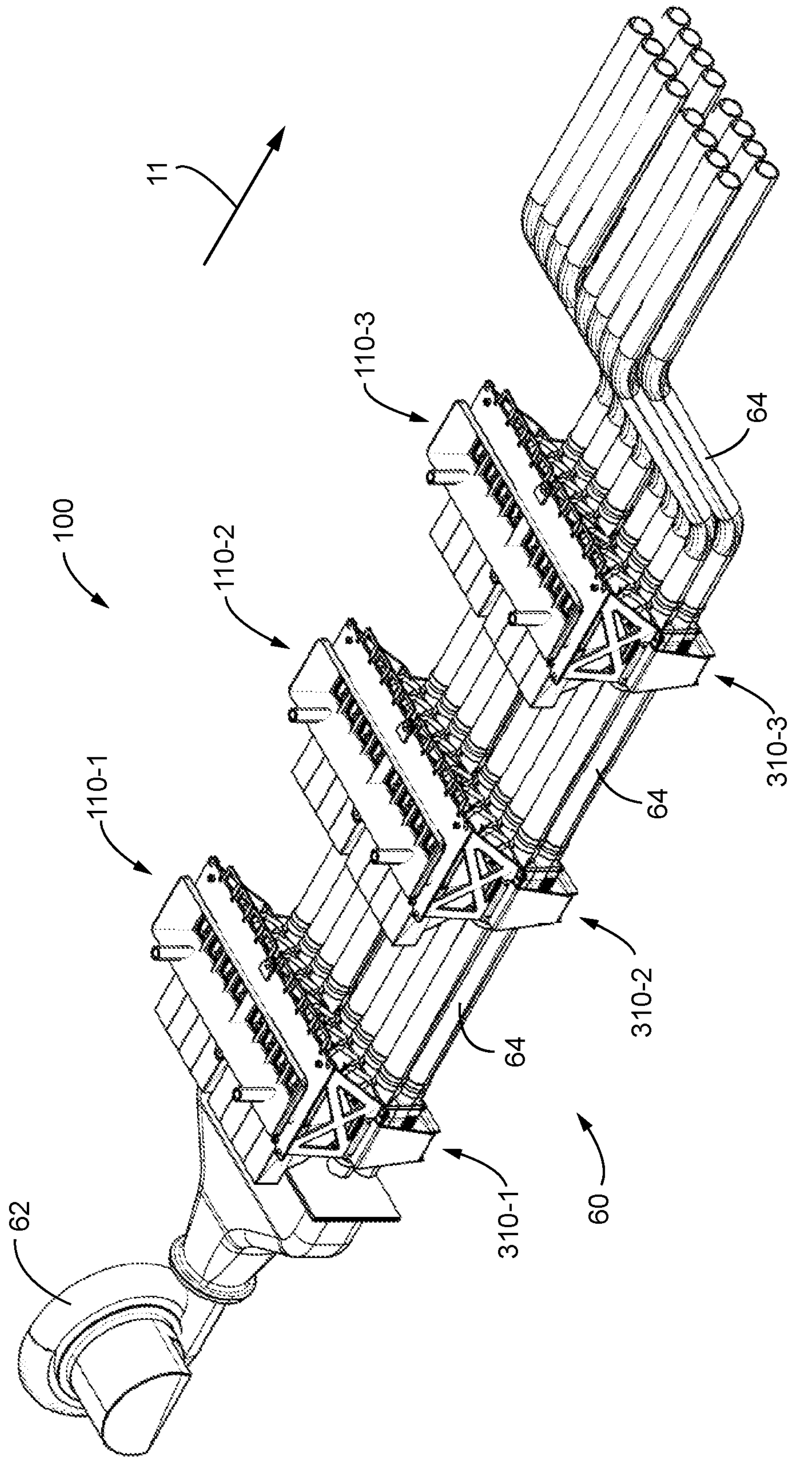
FIG. 5 is a front perspective view of the air system and modular metering system of the cart of FIG. 1 with all of the structural elements of the air cart removed.

FIG. 5 is a perspective view of the air system 60 and modular metering system 100 shown in FIG. 4 with all of the structural elements of the air cart 10 removed. Each metering bank 110-1, 110-2, 110-3 is coupled to a respective air tube bank 310-1, 310-2, 310-3 disposed therebelow. As shown, the air system 60 includes a single centrifugal fan or blower 62, but the air system 60 may include multiple fans or blowers depending on air volume requirements. The fan or fans 62 may be supported by the main frame 12 of the air cart 10 as shown. Alternatively, although not shown, the fan or fans 62 may be disposed on the tractor 2 or on the applicator implement 1. Air tubes 64 extend between the fan 62 and the air tube banks 310. As described later, the air tube banks 310 are in communication with each of three metering banks 110-1, 110-2, 110-3. The metering banks 110-1, 110-2, 110-3 meter the product from the respective tanks 40-1, 40-2, 40-3 into the respective air tube banks 310-1, 310-2, 310-3 and from there into the air tubes 64 which connect to distribution tubes (not shown) at the forward end of the air cart 10 (or if the applicator implement is towed behind the air cart 10, then to the rear of the air cart 10). The distribution tubes distribute the product via the air stream to the row units of the applicator implement. It should be appreciated that the number of metering banks 110 and air tube banks 310 may include fewer than three or more than three depending on the number of tanks 40 on the cart 10.

Figure 6:
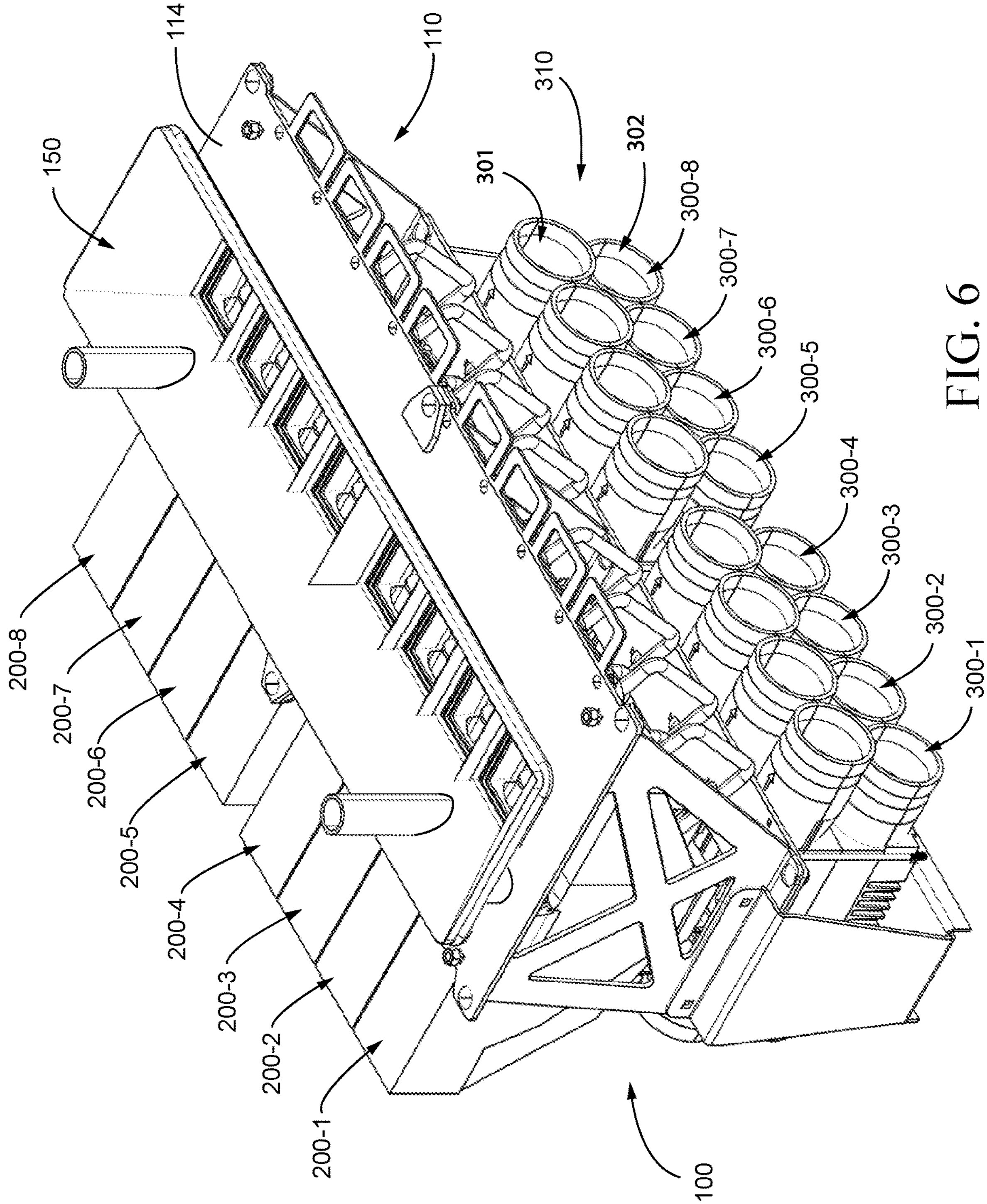
FIG. 6 is an enlarged front perspective view of one of the metering banks and air tube banks of the modular metering system of FIG. 5.
Figure 7:
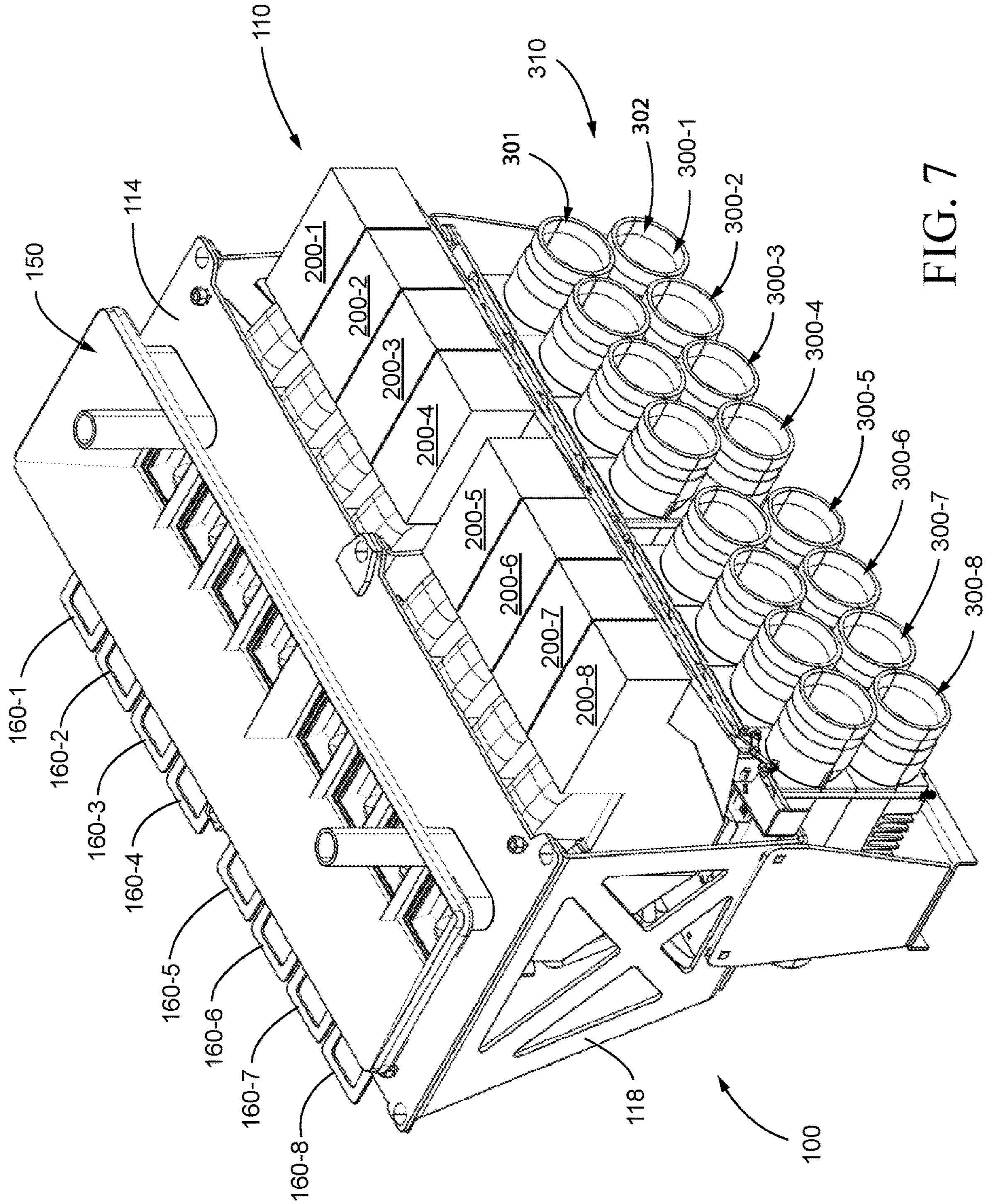
FIG. 7 is a rear perspective view of the metering bank and air tube bank of FIG. 6.
Figure 8:
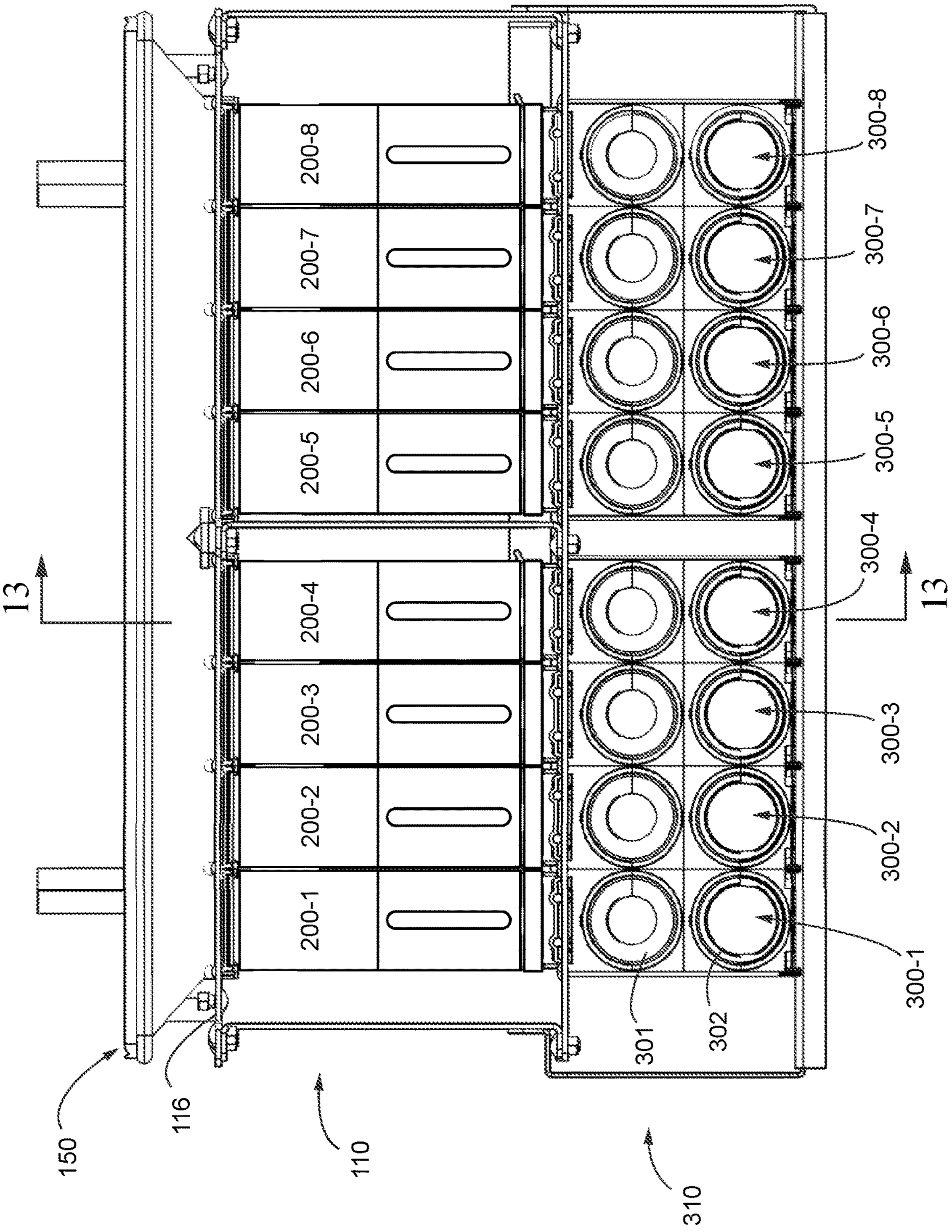
FIG. 8 is a front elevation view of the metering bank and air tube bank of FIG. 6.
Figure 9:
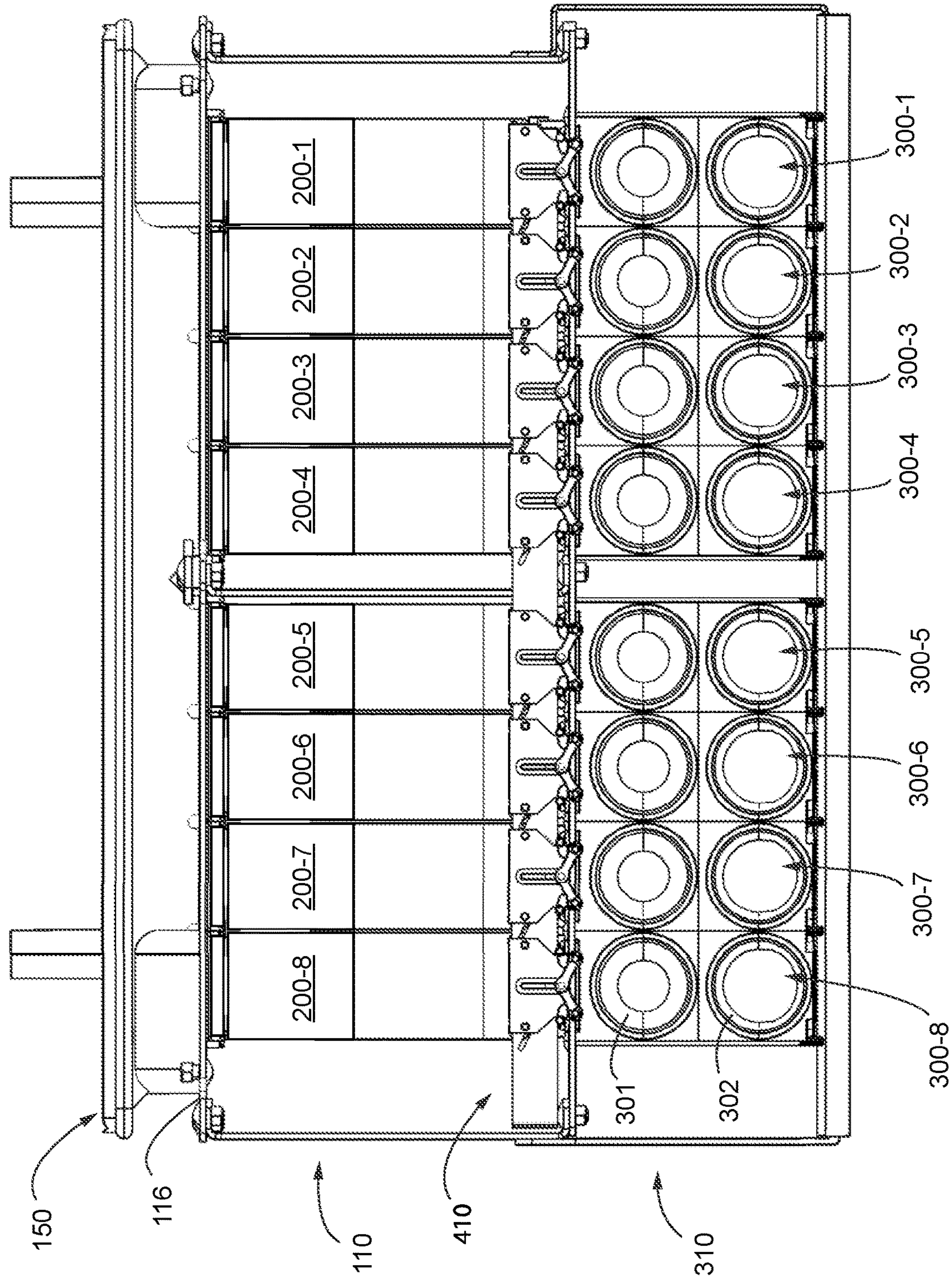
FIG. 9 is a rear elevation view of the metering bank and air tube bank of FIG. 6.

FIGS. 6 and 7 are enlarged front and rear perspective views, respectively, of an embodiment of one of the metering banks 110 and its associated air tube bank 310. FIGS. 8 and 9 are enlarged front and rear elevations views, respectively, of the metering bank 110 and the air tube bank 310. Each metering bank 110 includes a plurality of meter modules 200 and each air tube bank 310 includes a plurality of air tube modules 300. Each air tube module includes an upper air tube coupler 301 and a lower air tube coupler 302 in a double shoot configuration. In a single shoot embodiment, lower air tube coupler 302 is not present. In the embodiment illustrated, the metering bank 110 includes eight individual meter modules 200, designated by reference numbers 200-1 to 200-8 and eight air tube modules 300, designated by reference numbers 300-1 to 300-8. It should be appreciated that each meter module 200 is coupled to a corresponding air tube module 300. It should also be appreciated that the number of meter modules 200 in the metering bank 110 and the number of air tube modules 300 in the air tube bank 310 may include more or fewer than eight.

Figure 10:
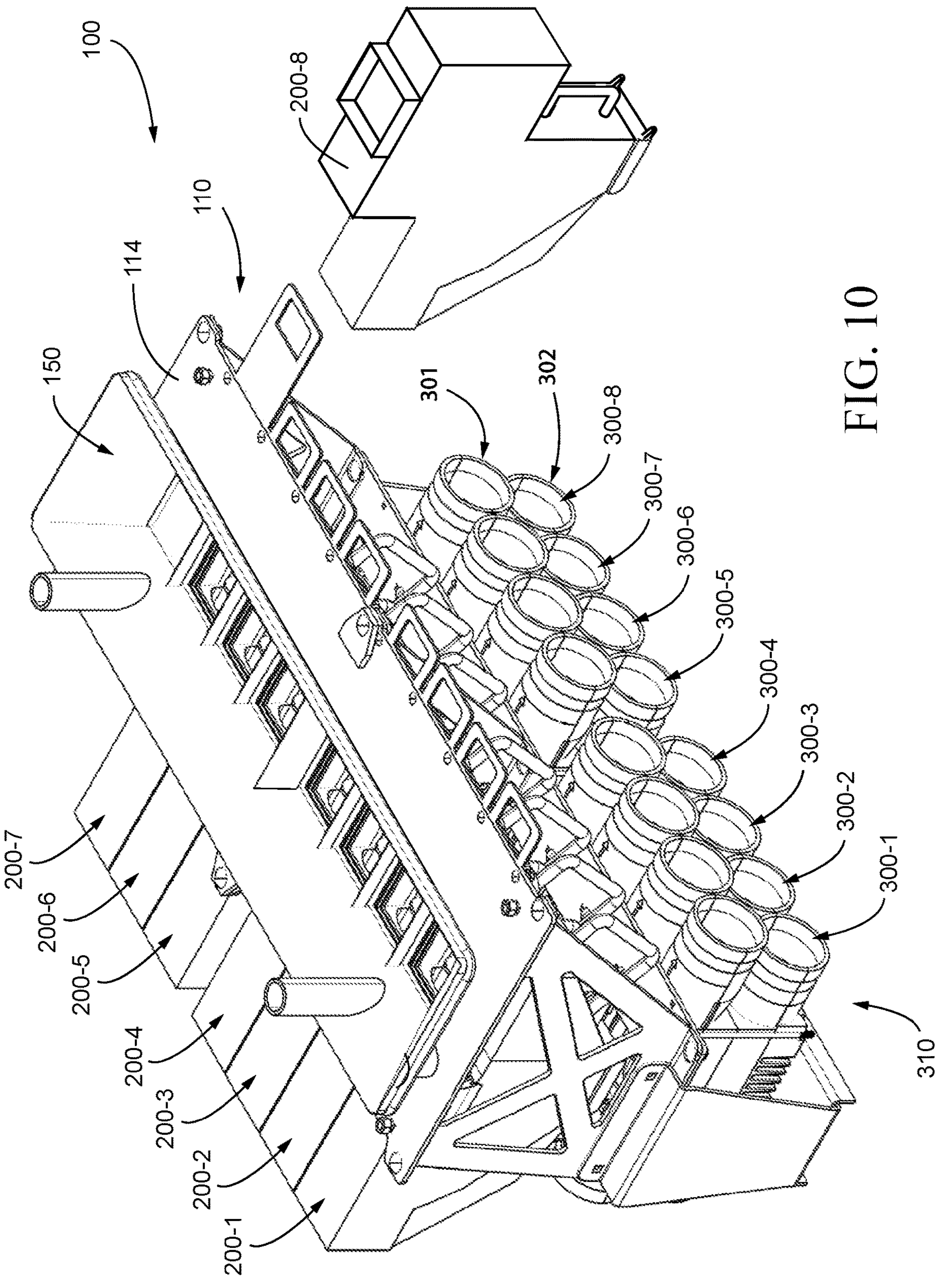
FIG. 10 is the same front perspective view of the metering bank and air tube bank of FIG. 6, but showing one of the meter modules removed from the metering bank.
Figure 11:
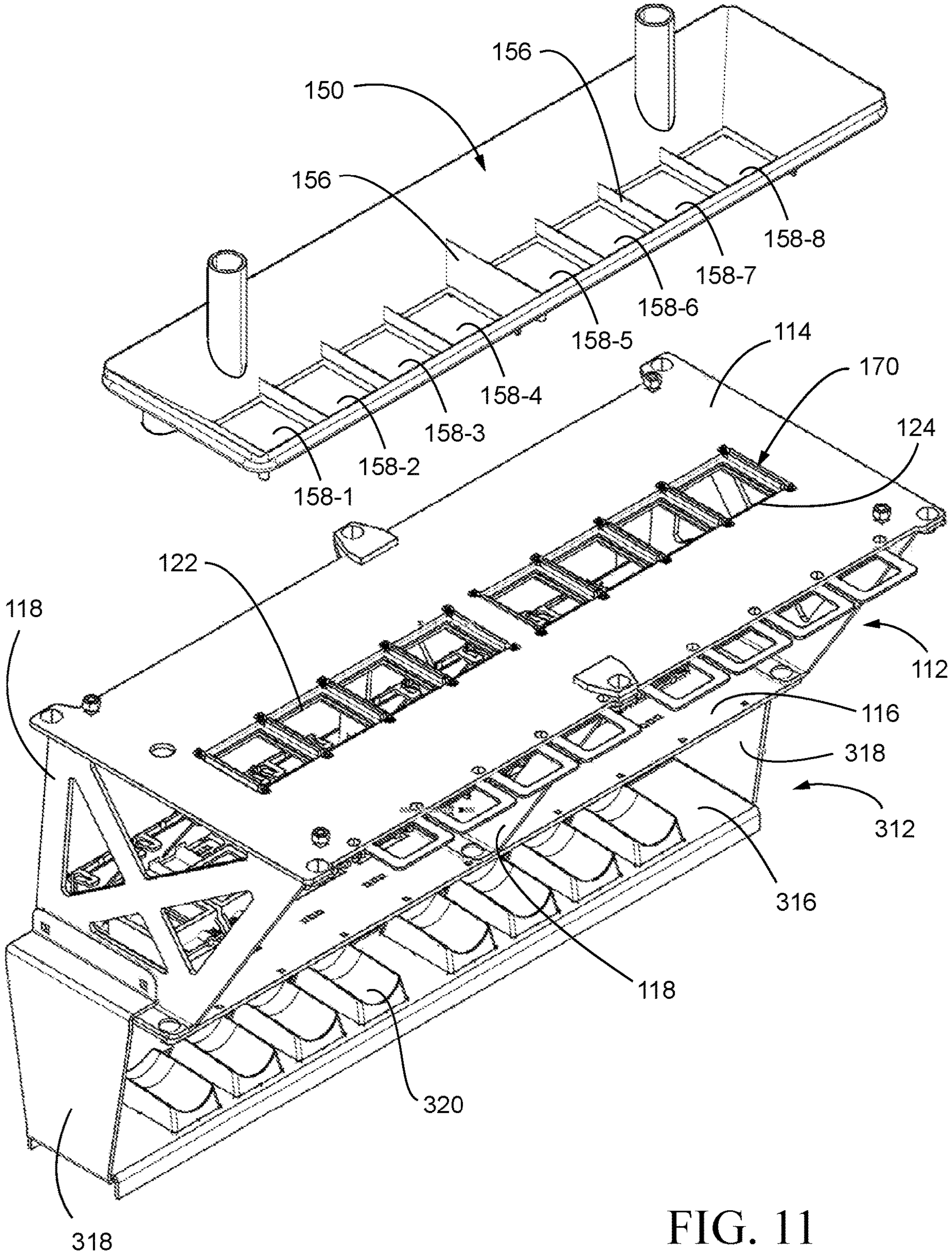
FIG. 11 is a partially exploded front perspective view of the metering bank and air tube bank of FIG. 6 with all of the meter modules and air tube modules removed to show the metering bank frame and air tube bank frame.
Figure 12:
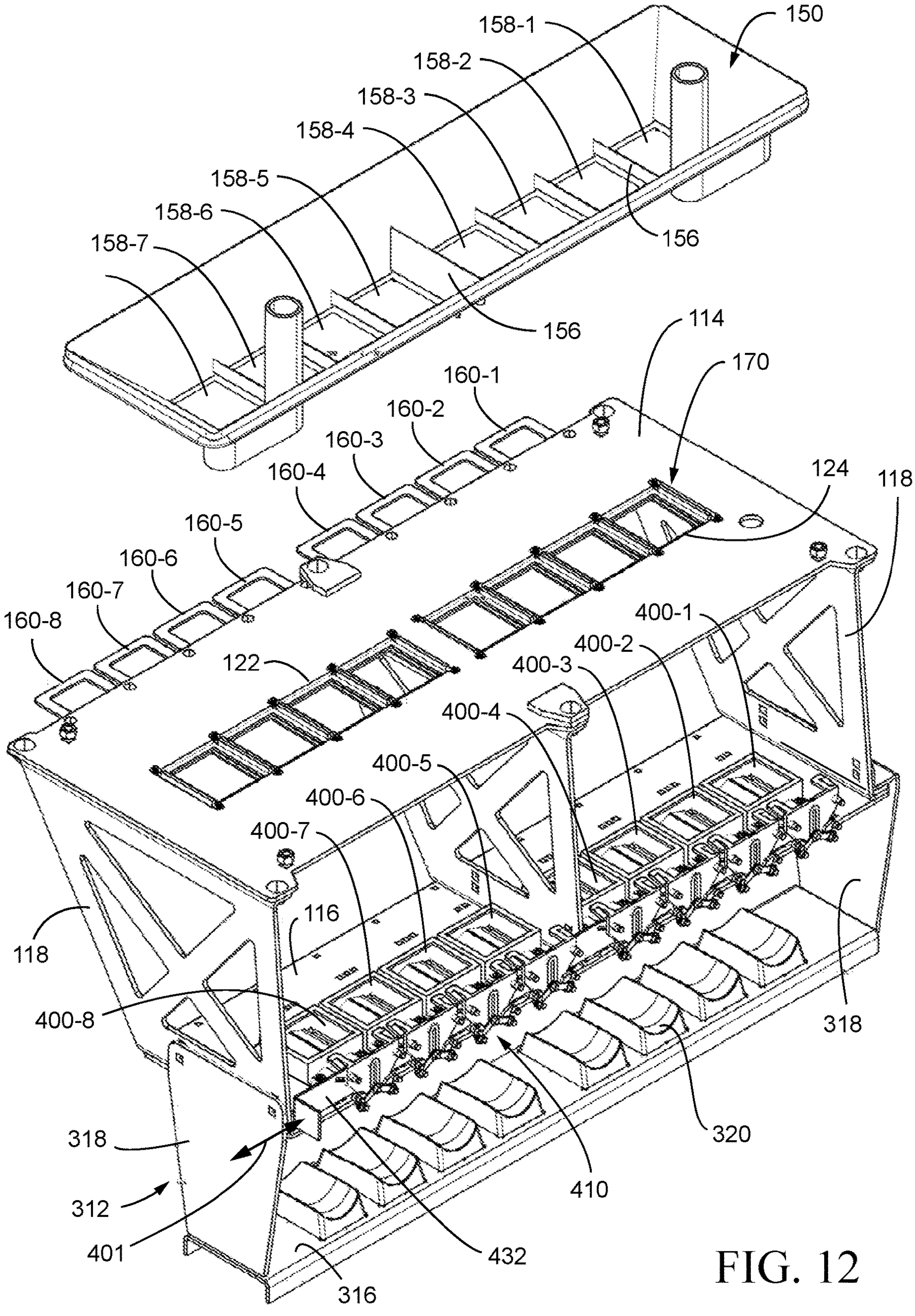
FIG. 12 is a partially exploded rear perspective view of the metering bank frame and air tube bank frame of FIG. 11.

As shown in FIG. 10 and described in detail later, each individual meter module 200 is slidably removable from the metering bank 110. FIGS. 11 and 12 are front and rear perspective views corresponding to FIGS. 6 and 7, respectively, but with all of the meter modules 200-1 to 200-8 removed from the metering bank 110 and with all of the air tube modules 300 removed from the air tube bank 310 to better illustrate the metering bank frame 112 and the air tube bank frame 312.

The metering bank frame 112 includes a top plate 114 and a bottom plate 116. The top plate 114 and bottom plate 116 are spaced apart and secured together by gussets 118. The air tube bank frame 312 includes a bottom member 316, which may be in the form of a channel for rigidity. The bottom member 316 is secured to the bottom plate 116 of the metering bank fame 112 in spaced relation by gussets 318. A plurality of tube saddles 320 are secured to the bottom member 316 for supporting and aligning the air tube modules 300 within the air tube bank 310.

Figure 13:
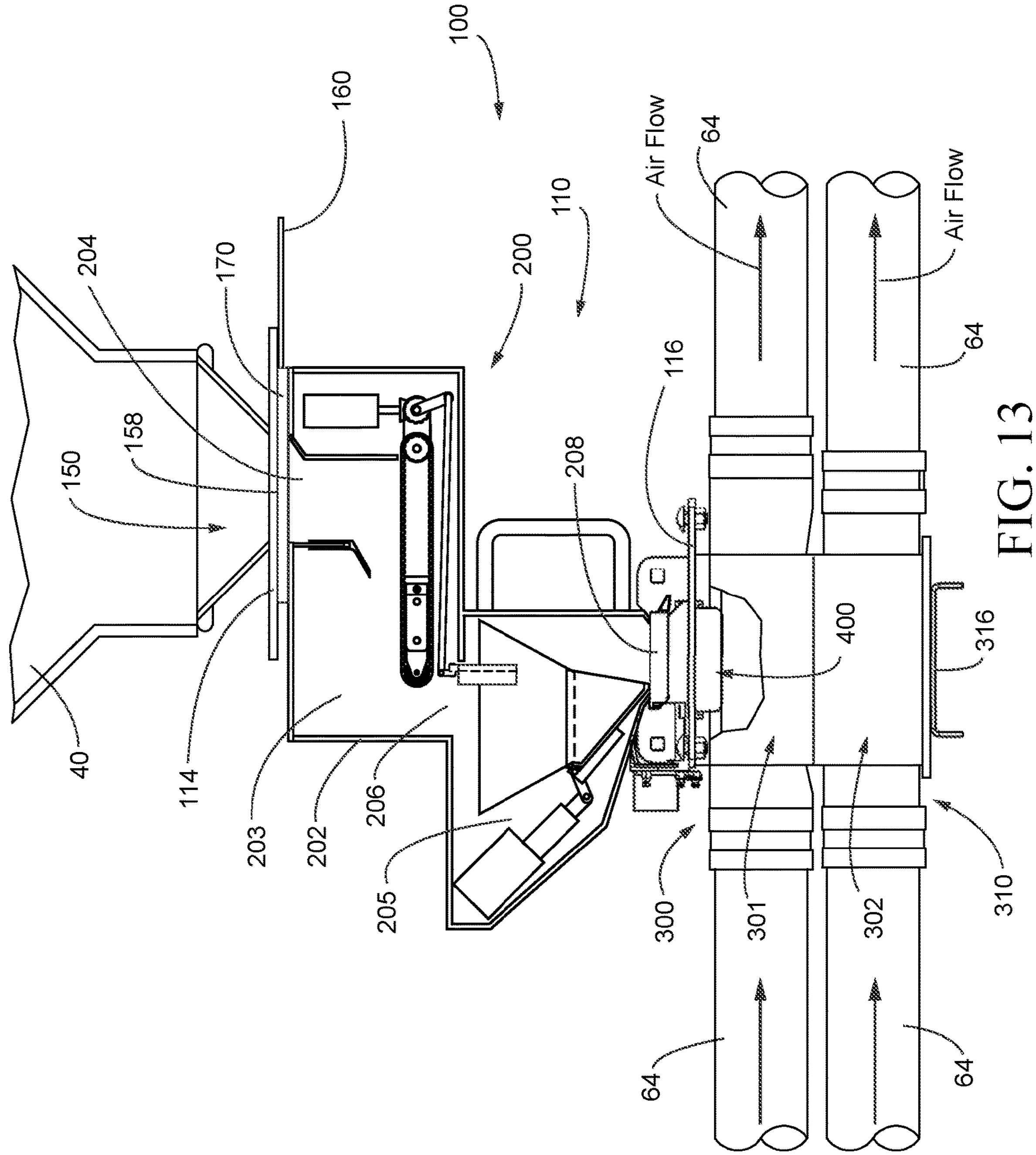
FIG. 13 is a side elevation view of the metering bank as viewed along lines 13-13 of FIG. 8 and showing the interface and of the tank, tank funnel, meter module and air coupling module.

FIG. 13 is a section view along lines 13-13 of FIG. 8 showing an individual meter module 200 seated within the metering bank 110 and showing the interface of the tank 40 with the tank funnel 150 (discussed below) and its relationship with the associated slide gate 160 (discussed below), its associated diverter gate module 400 (discussed below) and its associated air tube module 300. As will be described in more detail later, during operation, the product within the tank 40 flows via gravity out the bottom end of the tank 40 into the open upper flared end 152 of the tank funnel 150. The product passes downwardly through the associated bottom opening 158 of the tank funnel 150 into a top opening 204 of the meter module 200, assuming the associated slide gate 160 is in the open position. The meter module 200 meters the product (discussed below) into the respective air tube modules 300 after passing through the diverter gate module 400. The product is then carried by the air stream through the air tubes 64 for distribution to the row units of the applicator implement 1 by the distribution lines (not sown) coupled to the air tubes 64.

Figure 14:
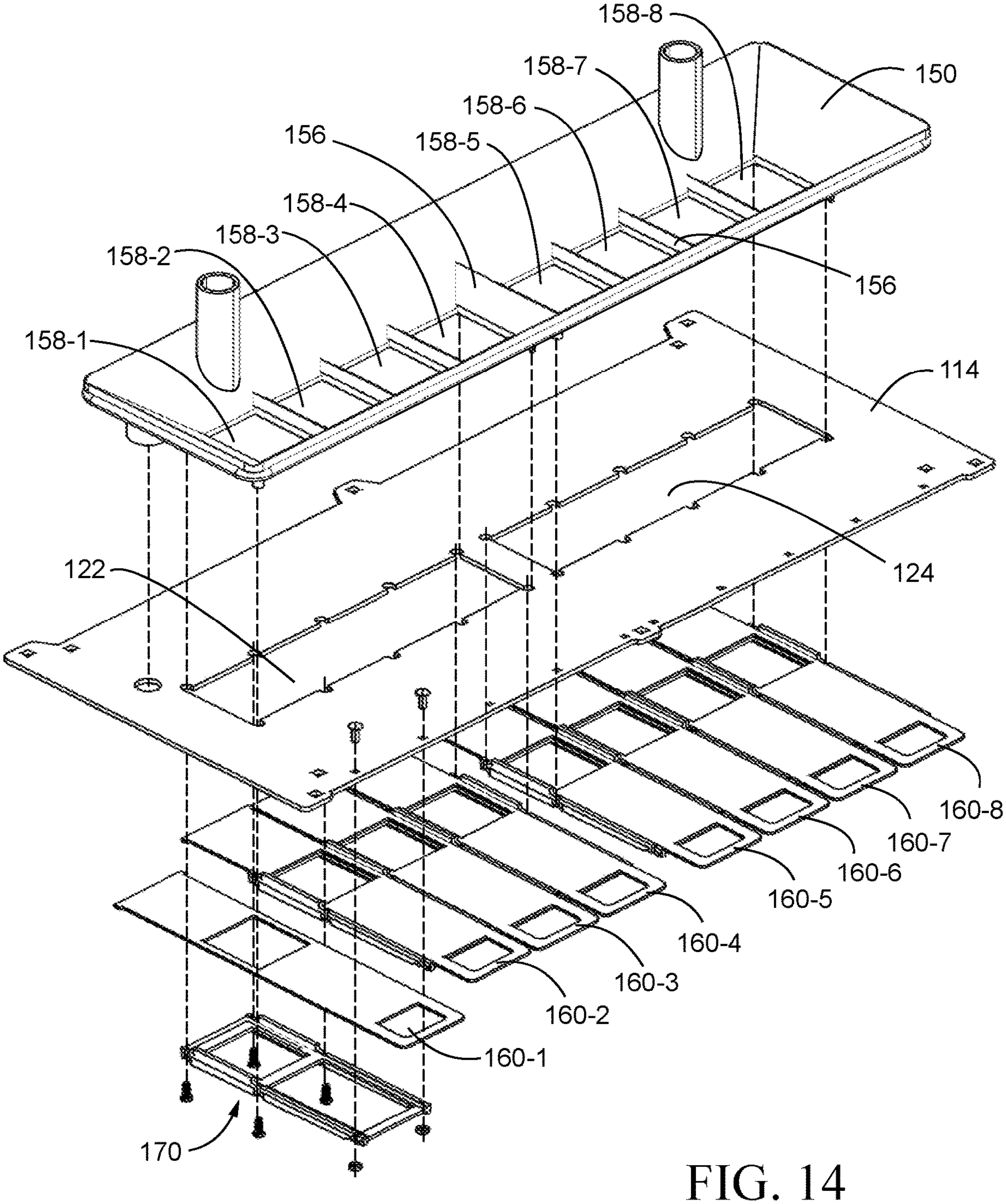
FIG. 14 is an exploded front perspective view showing the tank funnel, the top plate of the metering bank frame and the slide gates and the slide gate frames viewed from a top side of the top plate.

Continuing to refer to FIGS. 6-13, the tank funnel 150 is mounted to the top plate 114 of the metering bank 110. The top plate 114 has two elongated openings 122, 124 (FIG. 14). The tank funnel 150 has an open, flared upper end 152 and an open bottom end 154 separated into a series of bottom openings 158 by laterally spaced divider walls 156. The series of bottom openings 158, are designated by reference numbers 158-1 to 158-8. The middle divider wall 156 is larger than the other divider wall to span the area between the elongated openings 122, 124, thereby separating the bottom openings 158 into two groups of four openings, with the first group comprising openings 158-1 through 158-4 and the second group comprising openings 158-5 through 158-8. The first group of bottom openings 158-1 through 158-4 align with the first opening 122 in the top plate 114. The second group of bottom openings 158-5 through 158-8 align with the second opening 124 in the top plate 114.

Figure 15:
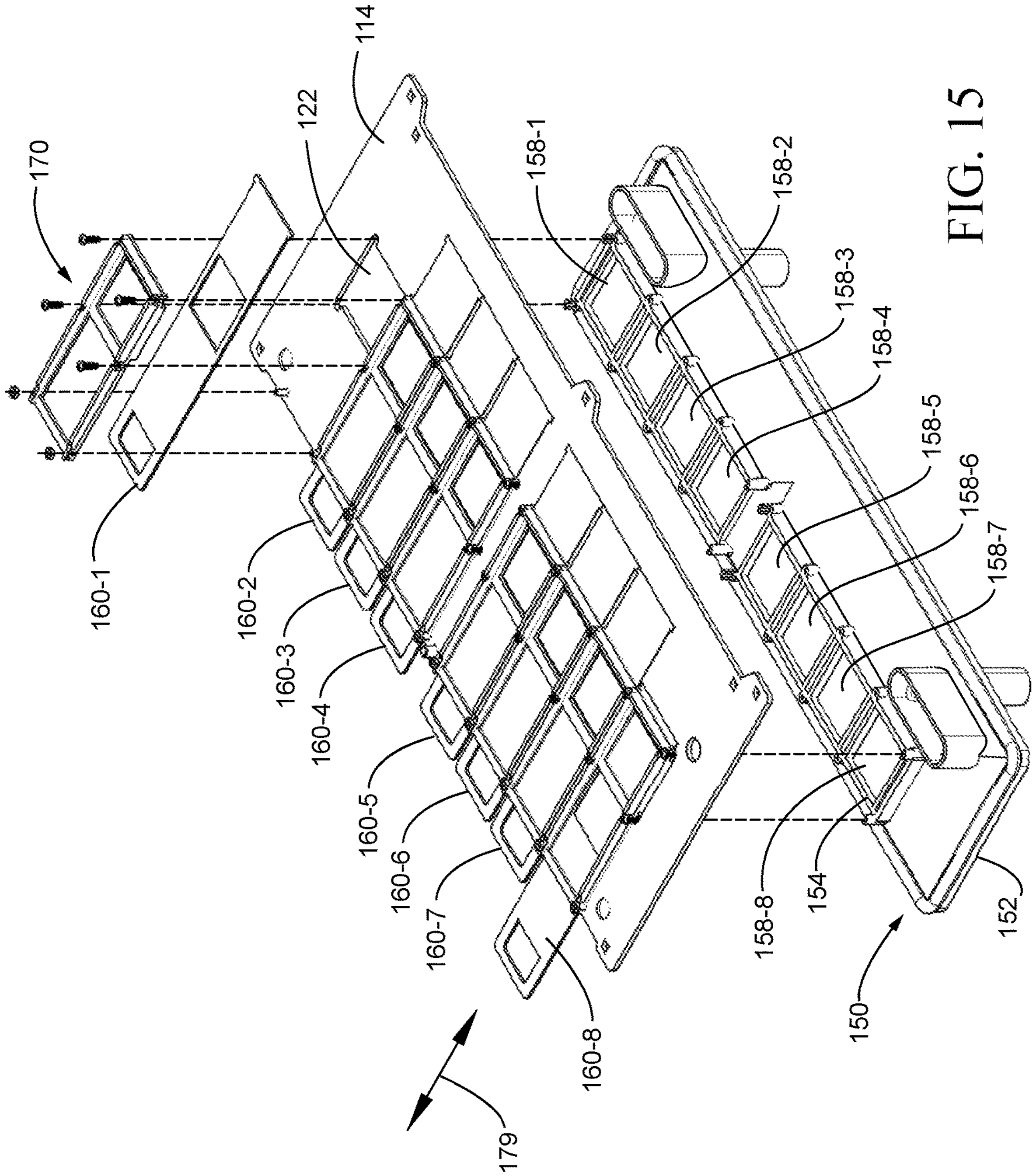
FIG. 15 is an exploded rear perspective view of FIG. 14 viewed from the underside of the top plate.
Figure 17:
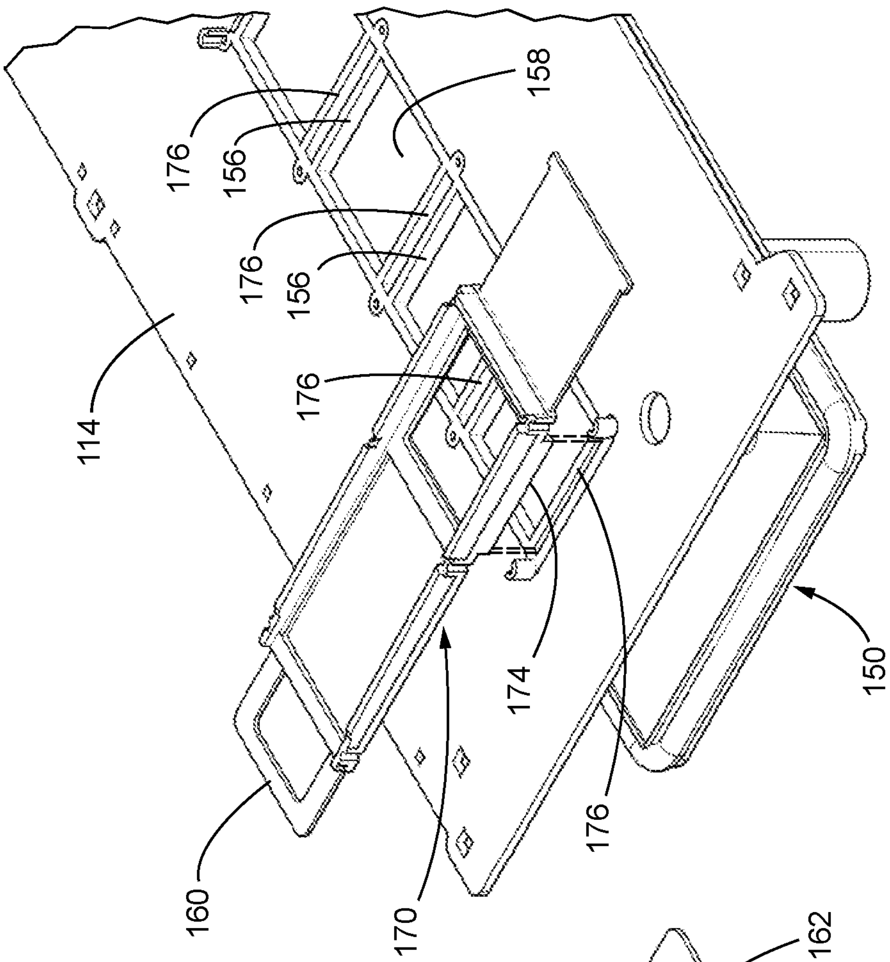
FIG. 17 is an enlarged, partially exploded rear perspective view of the slide gate and slide gate frame of FIG. 16 viewed from the underside of the top plate.
Figure 16:
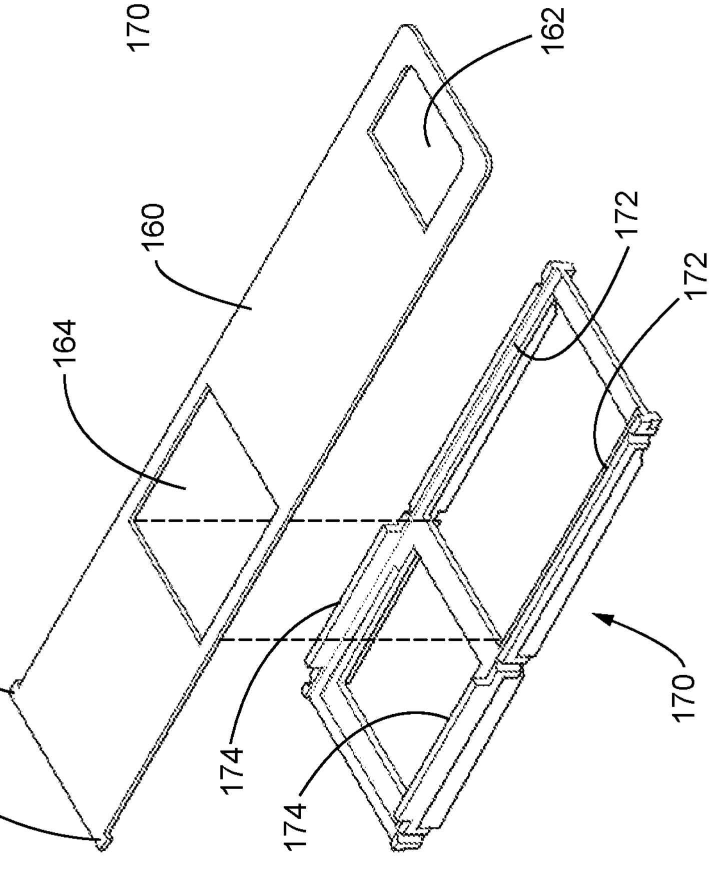
FIG. 16 is an exploded front perspective view of an embodiment of the slide gate and slide gate frame viewed from the top side of the slide gate.

As best shown in the exploded views of FIGS. 14-15, a series of slide gates 160 and slide gate frames 170 mount to the bottom side of the top plate 114. Each of the bottom openings 158-1 to 158-8 has an associated slide gate 160-1 to 160-8. As best shown in the enlarged views of FIGS. 16-17, each slide gate 160 includes a handle opening 162 at its forward end and a rearward product opening 164 through which product from the tank 40 will pass when the product opening 164 is aligned with the bottom openings 158 in the tank funnel 150. Each slide gate 160 is slidably secured to the bottom side of the top plate 114 by slide gate frames 170. The slide gate frame 170 includes opposing side channels 172 spaced to receive the slide gate 160 therebetween. The slide gate frame 170 includes an upper projection 174 that aligns with and is received by a cavity 176 (FIG. 17) in the bottom of each of the divider walls 156. The receipt of the upper projection 174 within the cavity 176, together with threaded connectors, rigidly, yet removable, secures the slide gate frame 170 to the bottom or underside of the top plate 114 and tank funnel 150. The slide gate 160 is thus permitted to slide fore and aft within the slide gate frame 170 as indicated by arrow 179 in FIG. 15 between a fully open position, in which the product opening 164 is aligned with the bottom opening 158 of the tank funnel 150, and a fully closed position, in which the rearward end of the slide gate 160 covers or closes off the bottom opening 158 of the tank funnel 150. The rearward end of the slide gate 160 includes outwardly projecting tabs 166 which act as stops by abutting against the rearward end of the slide gate frame 170 to prevent the slide gate 160 from being pulled out of the slide gate frame 170 and to indicate when the slide gate 160 is in the fully open position.

Based on the foregoing, and as best viewed in FIGS. 6 and 7, it should be appreciated that below each of the respective slide gates 160-1 to 160-8, and thus below each of the respective bottom openings 158-1 to 158-8 of the tank funnel 150, is an associated one of the meter modules 200-1 to 200-8. Thus, if it is desired to independently remove any one of the meter modules 200 from the metering bank 110 for service or repair, the operator may pull the associated slide gate 160 outwardly (forwardly) to the closed position, thereby closing-off the associated opening 158 in the tank funnel 150. Once the opening 158 is closed off by the slide gate 160, the meter module 200 below the closed slide gate 160 may be safely pulled out of the metering bank 110 without any of the product within the tank funnel 150 or the tank 40 above spilling out. Thus, it should be appreciated that any one of the meter modules 200, or all of the meter modules 200 may be pulled out of the metering bank 110 at any time for service or repair, even while the tank 40 is completely full. FIG. 10 is an example showing the slide gate 160-8 in the closed position and with the meter module 200-8 removed from the metering bank 110. When it is desired to resume operation, the meter module 200 is simply slid back into the metering bank 110 and the associated slide gate 160 pushed inward (rearward) to the open position, permitting product within the tank 40 to pass through the now-open opening 158 at the bottom of the tank funnel 150.

Referring to FIGS. 9 and 12, a diverter gate assembly 410 controls the flow of product between the meter modules 200 and the upper and lower air tube couplers 301, 302 of the respective air tube modules 300. The diverter gate assembly 410 includes a series of diverter gate modules 400, designated 400-1 to 400-8, each disposed below the respective meter modules 200-1 to 200-8 and above the respective air tube modules 300-1 to 300-8. While this configuration applies to a double chute configuration, it also applies to a single chute configuration in which air tube coupler 302 is not present.

Figure 18:
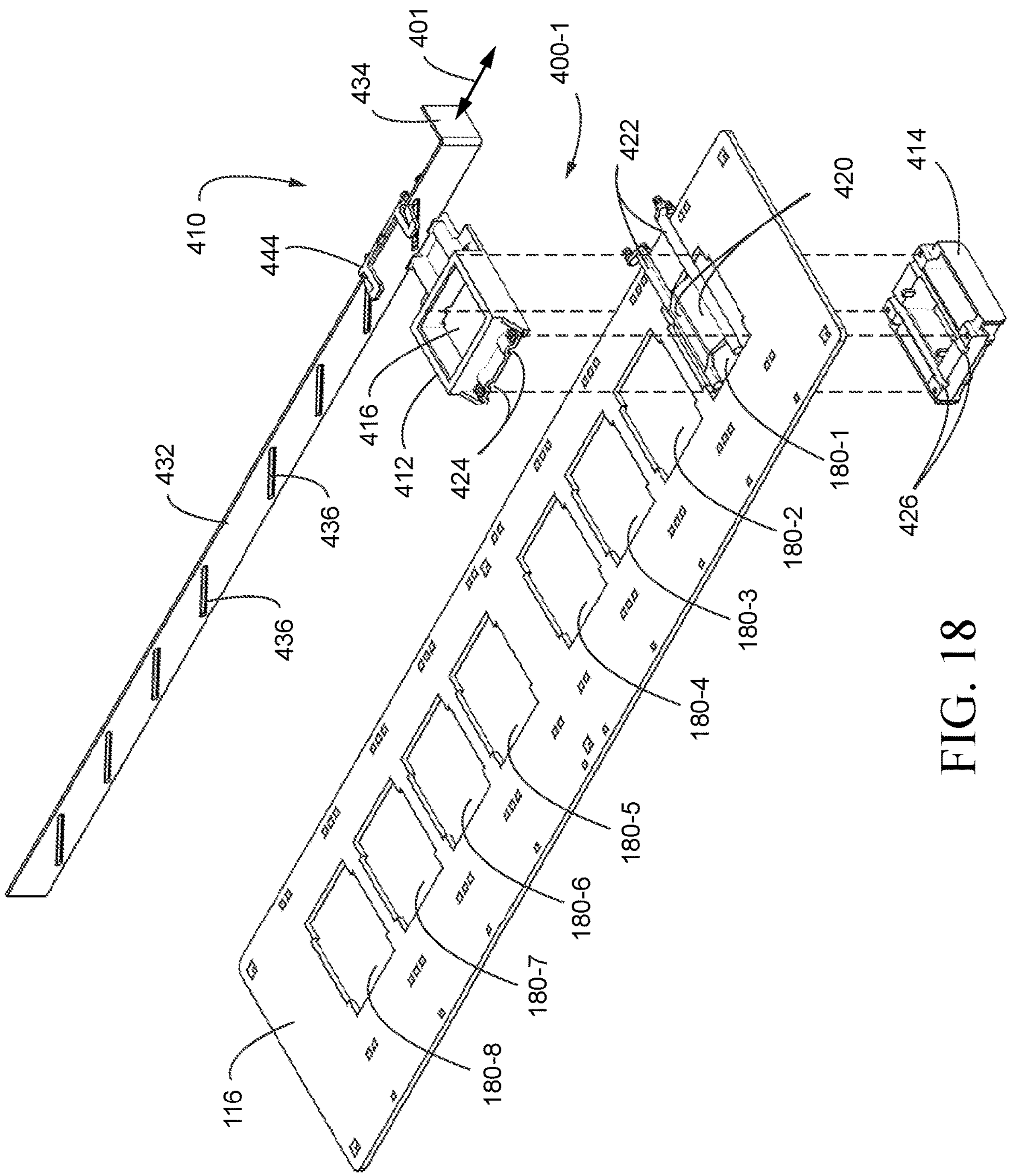
FIG. 18 is an exploded front perspective view showing an embodiment of the diverter gate assembly.
Figure 19:
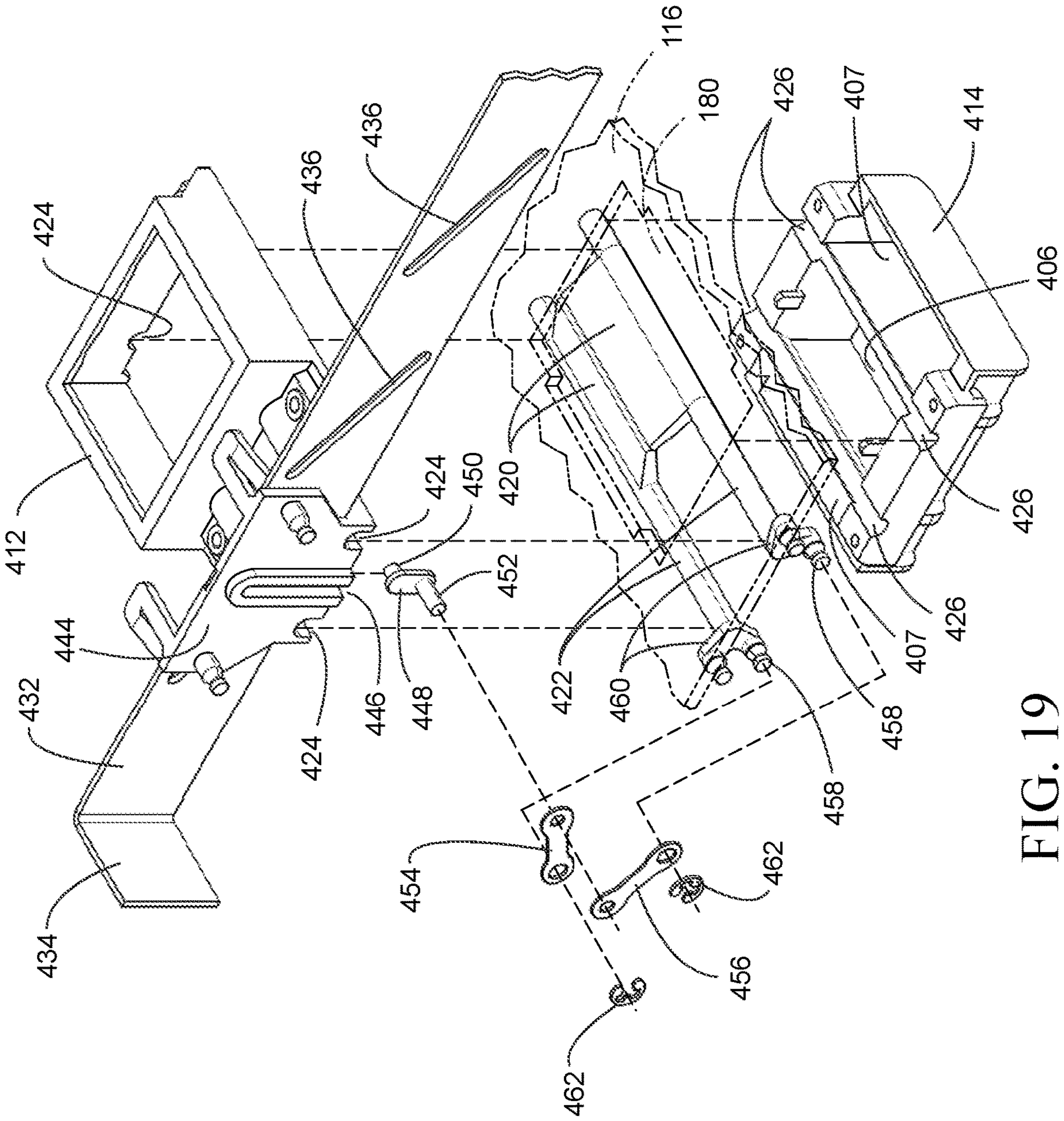
FIG. 19 is an enlarged exploded rear perspective view of the diverter gate assembly of FIG. 18.
Figure 20B:
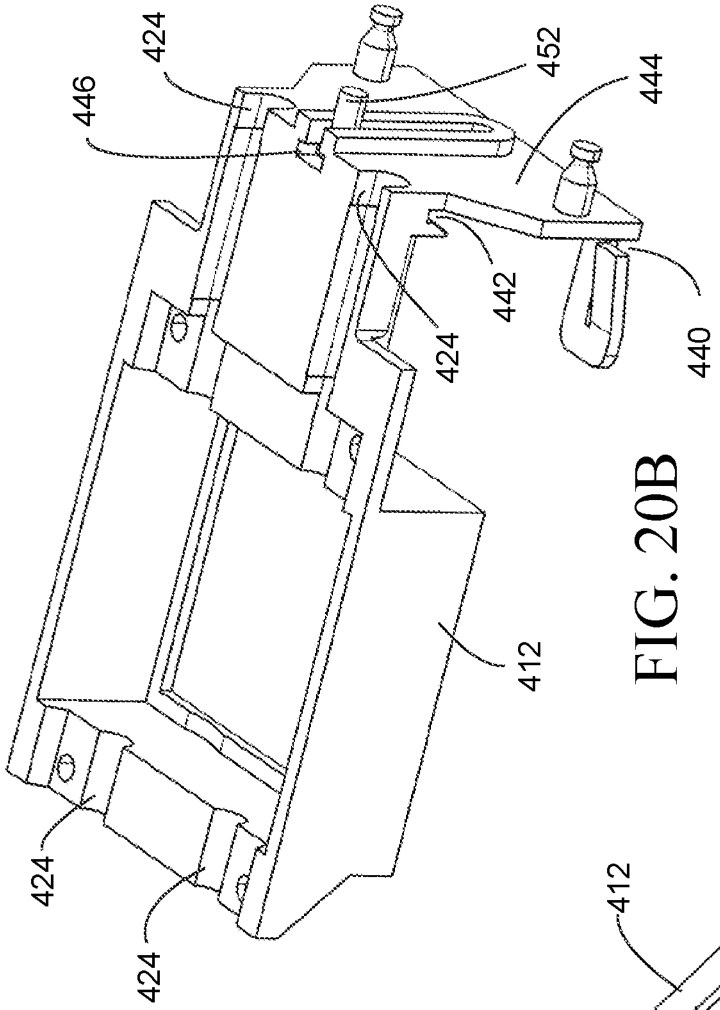
FIGS. 20A and 20B are top and bottom perspective views, respectively, of the upper housing portion of a diverter gate module.
Figure 20A:
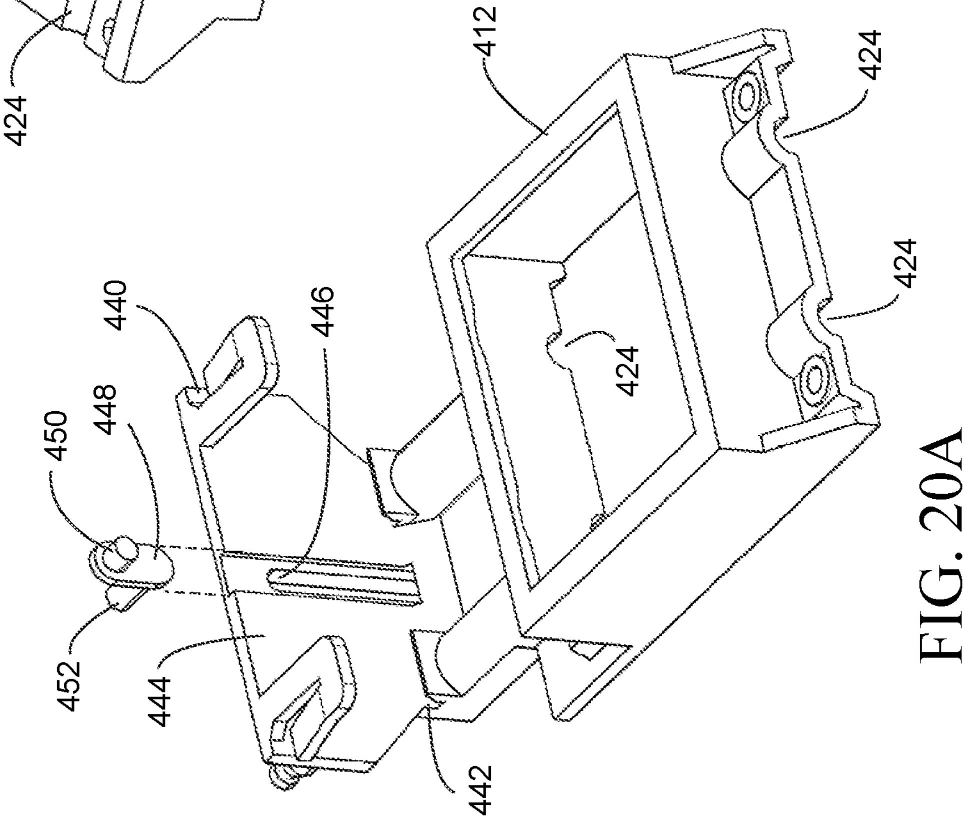

FIGS. 18 and 19 are partially exploded front and rear perspective views, respectively, of the diverter gate assembly 410. Each diverter gate module 400 is disposed over a respective aperture 180-1 to 180-8 in the bottom plate 116 of the metering bank 110. Each diverter gate module 400 includes a top frame member 412 disposed on a top side of the bottom plate 116 and a bottom frame member 414 disposed on a bottom side of the bottom plate 116. FIGS. 20A-20B are top and bottom perspective views of the top frame member 412. The bottom frame member 414 defines a center passage 406 and two outer passages 407. A pair of diverter gates 420 are pivotally restrained via respective shafts 422 received within top and bottom recesses 424, 426 in the respective top and bottom frame members 412, 414 which matingly align to form a cylindrical bore within which the shafts 422 are pivotally received. Threaded connectors (not shown) secure the top and bottom frame members 412, 414 together over the aperture 180 in the bottom plate 116, and pivotally restrain the shafts 422 within the cylindrical bore, and thus pivotally restraining the diverter gates 420.

Figure 21A:
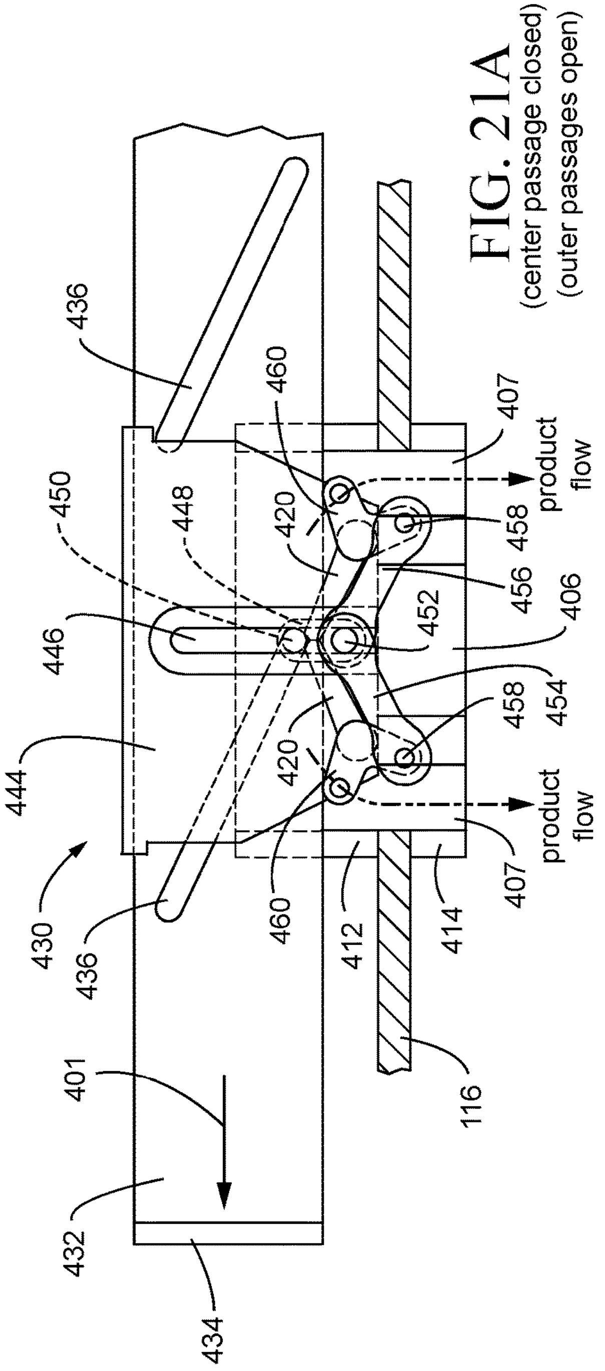
FIGS. 21A and 21B are rear elevation views of the diverter gate module in partial cross section showing operation of the diverter gate actuator and associated movement of the diverter gates between the closed position and open position, respectively.
Figure 21B:
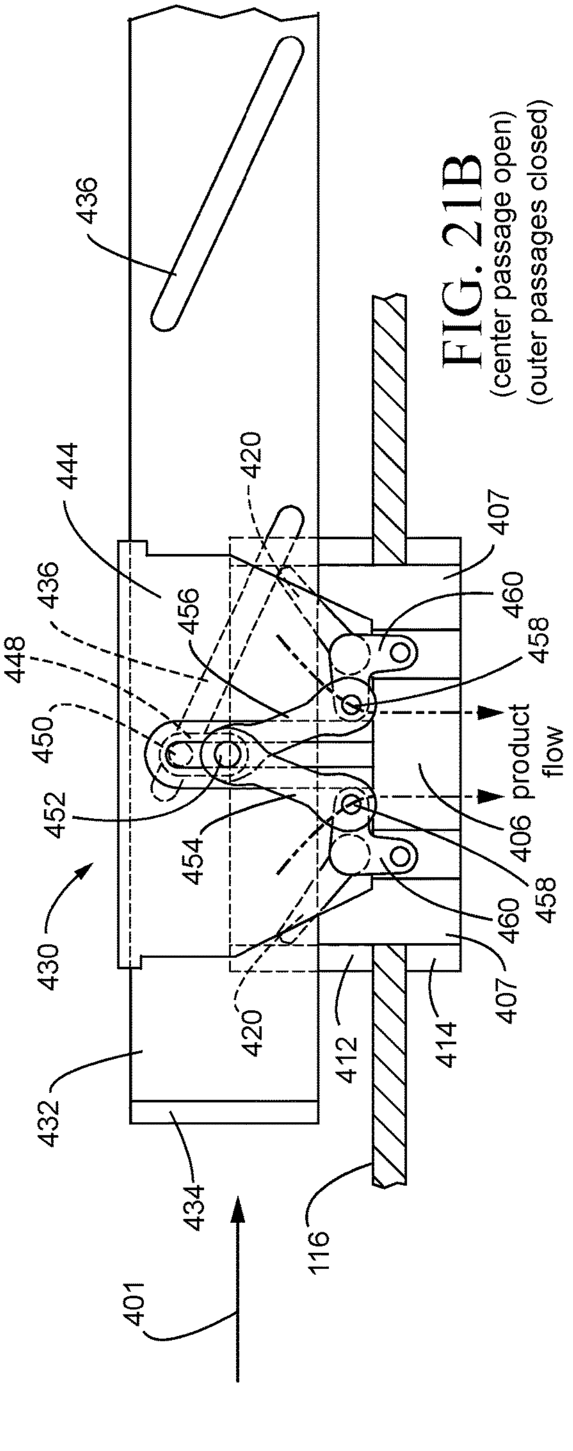

FIGS. 21A and 21B are rear elevation views in partial section schematically illustrating the pivotal movement of the diverter gates 420 between a first position (FIG. 21A) and a second position (FIG. 21B). In the first position, the center passage 406 is closed by the diverter gates 420 and the outer passages 407 are open to allow product flow to one of the upper and lower air tube couplers 301, 302 of the air tube module 300 therebelow. In the second position (FIG. 21B), the outer passages 407 are closed by the diverter gates 420 and the center passage 406 is open to allow product flow to one of the upper and lower air tube couplers 301, 302 of the air tube module 300 therebelow.

The diverter gates 420 are moved between the first position and the second position by a diverter gate actuator 430. As best viewed in FIGS. 12 and 18, the diverter gate actuator 430 includes an elongated plate 432 coupled to each of the diverter gate modules 400. One end of the elongated plate 432 includes a handle 434 which may be in the form of a 90 degree bend at the end of the elongated plate 432. By pulling and pushing on the handle 434, the elongated plate 432 is moved transversely as indicated by arrow 401, all of the diverter gates 420 of each of the diverter gate modules 400-1 to 400-8 may be collectively opened or closed as hereinafter described.

Referring to FIGS. 18-19 and 21A-21B, the elongated plate 432 includes a series of diagonal slots 436. The elongated plate 432 is slidably received between top and bottom channels 440, 442 (FIG. 20A-20B) of the actuator bracket 444 extending rearwardly from the top frame member 412. As best viewed in FIGS. 19 and 20A-20B, the actuator bracket 444 includes a vertical slot 446 which receives a slide member 448. The slide member 448 has a forwardly extending peg 450 which is received within one of the diagonal slots 436 of the elongated plate 432. The slide member 448 also includes a rearward extending peg 452. Referring to FIGS. 19, 21A and 21B, the rearwardly extending peg 452 receives one end of a pair of links 454, 456. The other end of each of the links 454, 456 is received by a rearwardly extending post 458 on a cam 460 at the rearward end of the shaft 422 of each of the diverter gates 420. Retainer clips 462 (FIG. 19) may secure the links 454, 456 onto the posts 458 and the peg 452. Referring to FIGS. 21A and 21B, it should be appreciated that when the elongated plate 432 is moved to the left (as indicated by arrow 401 in FIG. 21A), the diagonal slot 436 forces the slide member 448 downwardly within the vertical slot 446 due to the diagonal slot's engagement with the forwardly extending peg 450 on the slide member 448. As the slide member 448 is forced downwardly, the links 454, 456 (coupled between the rearwardly extending peg 452 and the posts 458), cause the diverter gates 420 to pivot to the first position (FIG. 21A) closing off the center passage 406 and opening the outer passages 407 to flow of the product therethrough. Conversely, when the elongated plate 432 is moved to the right (as indicated by arrow 401 in FIG. 21B), the diagonal slot 436 forces the slide member 448 upwardly within the vertical slot 446 due the diagonal slot's engagement with the forwardly extending peg 450 on the slide member 448. As the slide member 448 is forced upwardly, the links 454, 456 (coupled between the rearwardly extending peg 452 and the posts 458), cause the diverter gates 420 to pivot into the second position (FIG. 21B) closing off the outer passages 407 and opening the center passages 406 to flow of the product therethrough.

Figure 22:
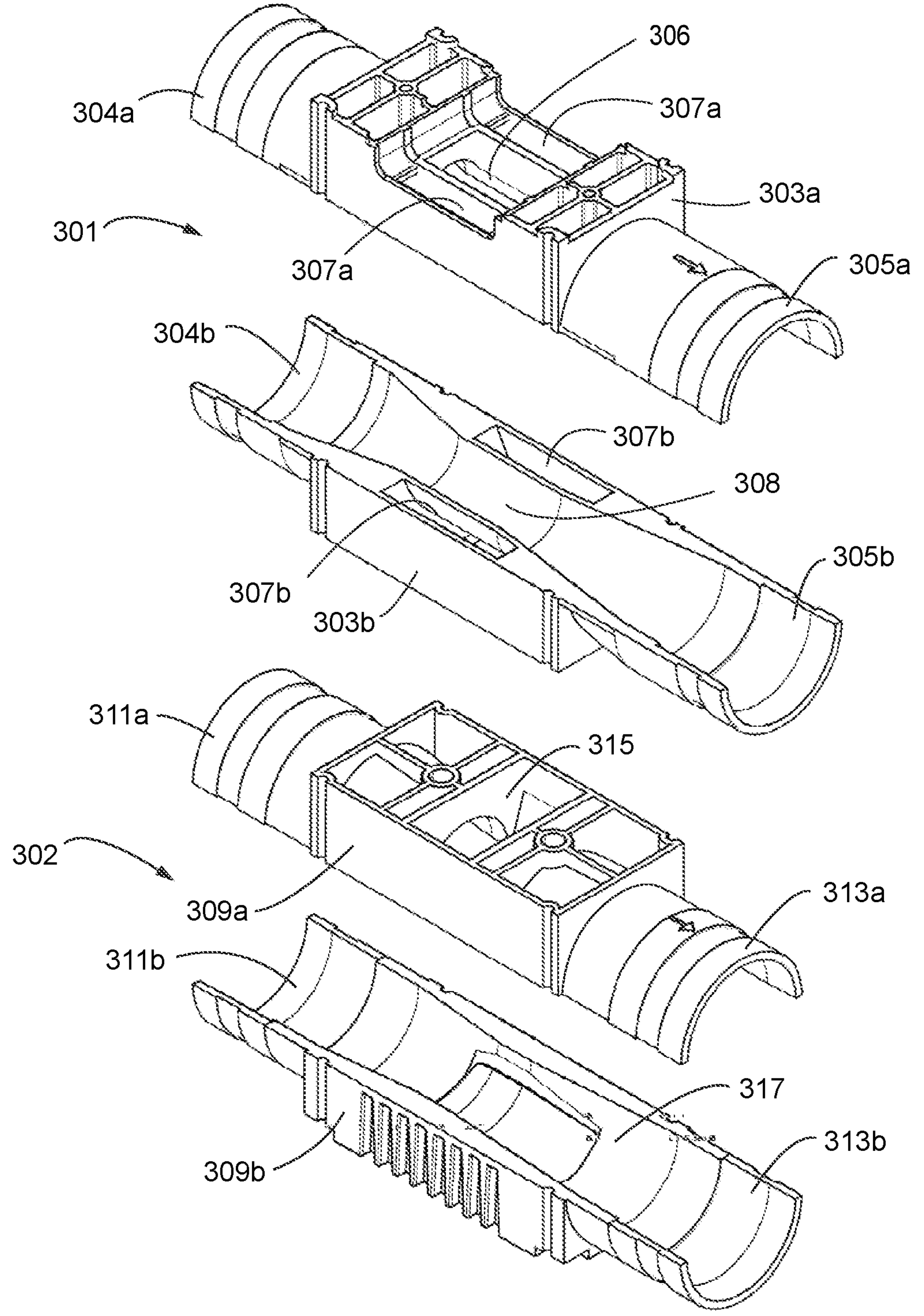
FIG. 22 is an exploded perspective view an air tube module showing the upper air tube coupler and lower air tube coupler each exploded into half-sections to show the passages therethrough.

FIG. 22 is an exploded perspective view of an air tube module 300 showing the upper air tube coupler 301 and lower air tube coupler 302. The upper air tube coupler 301 is exploded into half-sections to show the passages therethrough with mating components of the half-sections designated by the suffixes "a" and "b". Similarly the lower air tube coupler 302 is exploded into half-sections to show the passages therethrough with mating components of the half-sections designated by the suffixes "a" and "b".

The upper air tube coupler 301 includes a block shaped body 303 with an inlet pipe section 304 and an outlet pipe section 305. The upper end of the block shaped body 303 has an upper end configured to receive and mate with the bottom frame member 414 of the diverter gate module 400. A longitudinal air flow passage 308 extends longitudinally through the block shaped body 303 and each of the inlet and outlet pipe sections 303, 305. The upper end of the block shaped body 303 includes a center passage 306 and outer passages 307. The center passage 306 is in communication with the longitudinal air flow passage 308. The outer passages 307 extend vertically through the block body 303 and are not in communication with the longitudinal air flow passage 308. The lower air tube coupler 302 includes a block shaped body 309 with an inlet pipe section 311 and an outlet pipe section 313. The upper end of the lower air tube coupler 302 includes an open area 315 that is in communication with a longitudinal air flow passage 317 extending longitudinally through the block shaped body 309. The open area 315 of the lower block shaped body 309 is in communication with the outer passages 307 of the upper air tube coupler 301. Thus, when the diverter gates 420 are in the first position (FIG. 21A) with the center passage 406 closed by the diverter gates 406 the product is directed by the diverter gates 420 into the outer passages 407 of the diverter gate module 400 and into the outer passages 307 of the upper air tube coupler 301. The product passes vertically through outer passages 307 in upper air tube coupler 301 and into the open end 315 of the lower air tube coupler 302 where the product then enters the longitudinal air flow passage 317 and is carried by the air stream flowing through longitudinal air flow passage 317 communicated by the air tubes 64 coupled at each end of the inlet and outlet pipe sections 311, 313 and the product is then distributed by the distribution tubes (not shown) coupled at the forward end of the air tubes 64 as previously explained. If, however, the diverter gates 420 of the diverter gate module 400 are in the second position (FIG. 21B) with the outer passages 407 closed by the diverter gates 420, the product is diverted into the center passage 406 of the diverter gate module 400 and into the aligned center passage 306 of the upper air tube coupler 301. The product falls through the center passage 306 into the longitudinal passage 308 whereupon the product is carried by the air stream passing through the longitudinal passage 308 communicated by the air tubes 64 coupled at each end of the inlet and outlet pipe sections 304, 305 and the product is then distributed by the distribution tubes (not shown) coupled at the forward end of the air tubes 64 as previously explained.

Meter Module Embodiments

Figure 23:
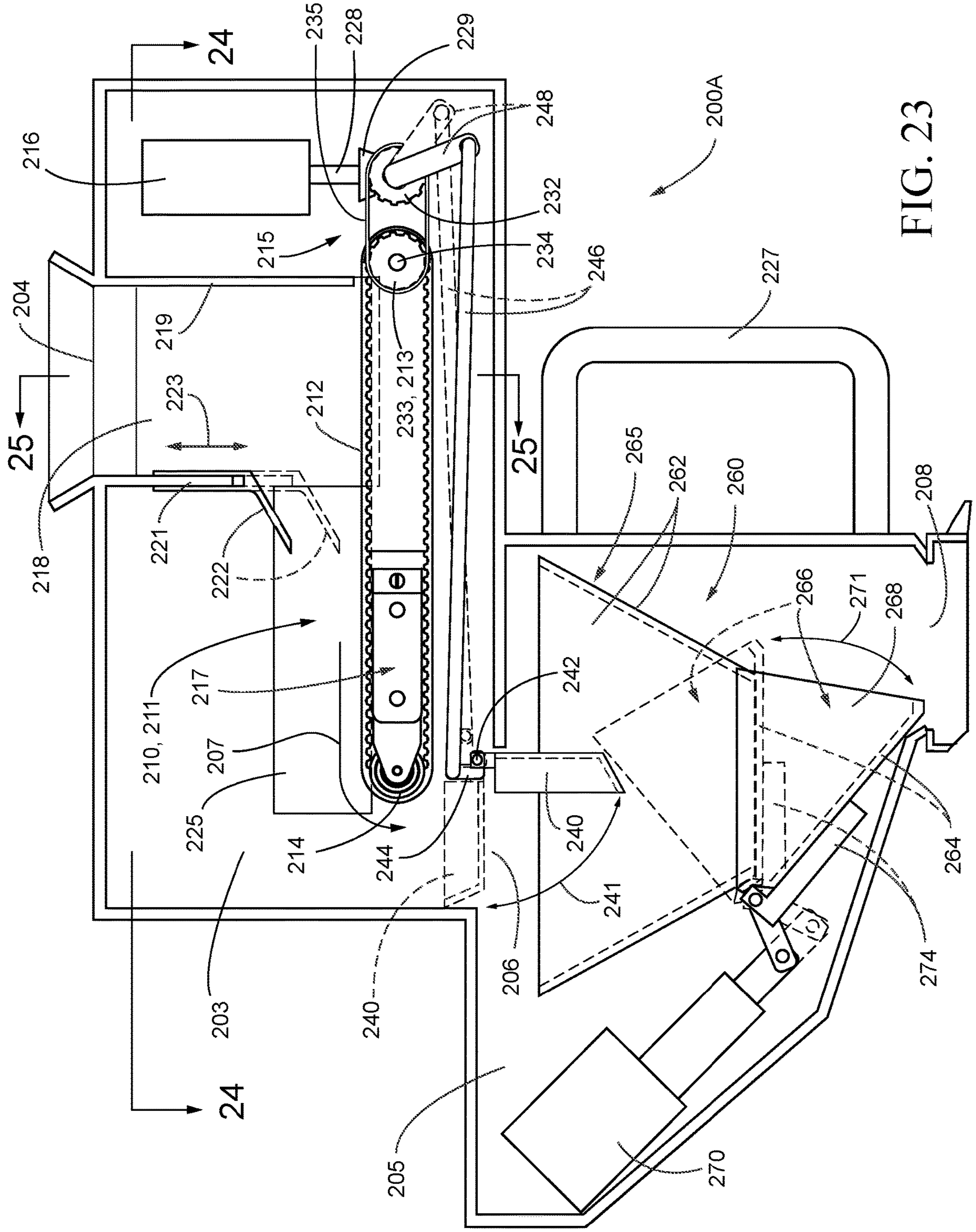
FIG. 23 is a left side elevation view of an embodiment of a meter module with the left sidewall of the main housing removed to show the internal components thereof and showing movement of some of the internal components.
Figure 24:
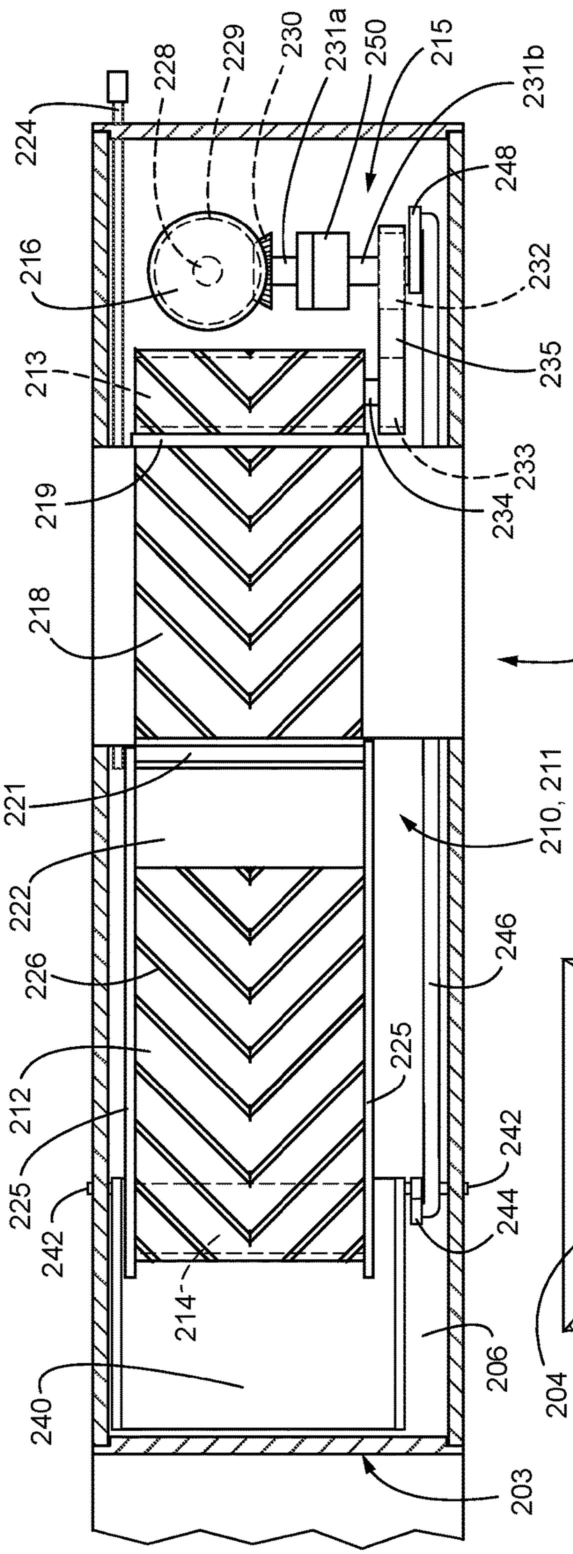
FIG. 24 is a cross-sectional view of the meter module of FIG. 23 as viewed along lines 24-24 of FIG. 23.
Figure 25:
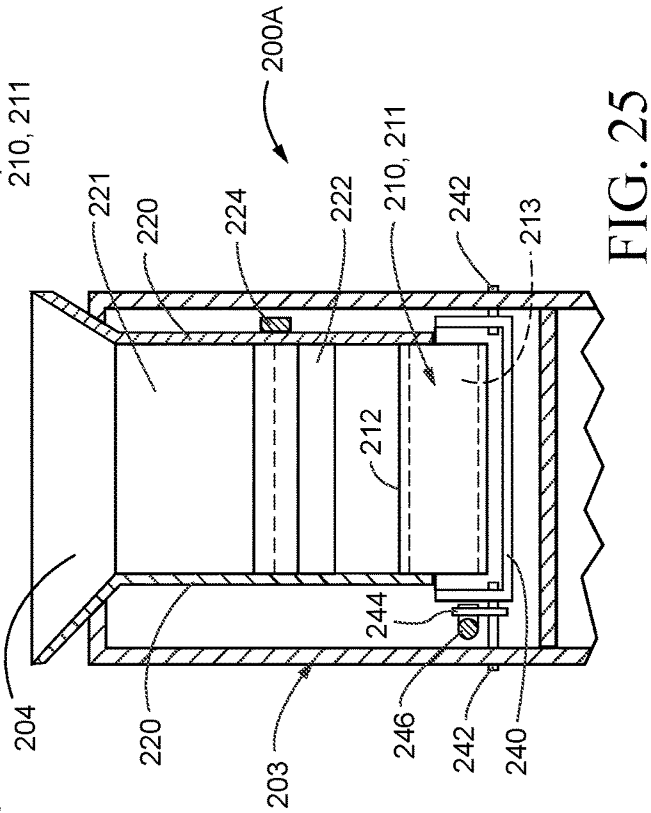
FIG. 25 is a cross-sectional view of the meter module as viewed along lines 25-25 of FIG. 24.

FIG. 23 is a left side elevation view of one embodiment of a meter module 200A with the left sidewall removed to show the internal components (discussed later) and movement of some of the internal components. FIG. 24 is a cross-sectional view of the meter module 200A as viewed along lines 24-24 of FIG. 23. FIG. 25 is a cross-sectional view of the meter module 200A as viewed along lines 25-25 of FIG. 24. The meter module 200A includes a main housing 202 substantially enclosing the internal components of the meter module 200A and defines its overall configuration for seating within the metering bank 110. The main housing 202 includes a meter housing portion 203 at the upper end of the main housing 202 and a lower chamber portion 205 below the meter housing portion 203. The meter housing portion 203 includes a top opening 204 at its upper forward end and an outlet 206 at its rearward end. The lower chamber portion 205 has a bottom opening 208 at its lowermost end. In reference to FIG. 13, it should be appreciated that the top opening 204 of the meter module 200A aligns with the bottom opening 158 of the tank funnel 150 and the bottom opening 208 of the meter module 200A aligns with the diverter gate module 400 when the meter module 200A is properly seated in the metering bank 110.

A meter mechanism 210 is received within the meter housing portion 203. In this embodiment, the meter mechanism 210 is illustrated as comprising a conveyor assembly 211. The conveyor assembly 211 is oriented and configured to convey the product in a direction generally parallel with the forward direction of travel 11 of the air cart 10. In the embodiment illustrated, the product entering the meter housing portion 203 through the top opening 204 is conveyed rearwardly in the direction indicated by arrow 207 (i.e., opposite the forward direction of the air cart 10 and opposite the direction of air flow through the air tubes 64) toward the outlet 206 at the rearward end of the meter housing portion 203. It should be appreciated that the arrangement illustrated in FIG. 23 is adapted for a tow-behind air cart. If the air cart is a tow-between air cart, the direction of conveyance of the product will be in the same direction as the air flow through the air tubes 64.

The conveyor assembly 211 comprises a continuous belt 212 that is disposed around a drive roller 213 and an idler roller 214. The belt 212 is operably driven by an electric motor 216 and a drive mechanism 215 (discussed later). The conveyor assembly 211 may include a belt tensioner 217 (FIG. 23) to enable adjustment of the longitudinal position of the idler roller 214 relative to the drive roller 213 in order to maintain the desired amount of tension on the belt 212. The belt tensioner 217 may be an auto-tensioning mechanism as well known in the art.

The product entering the meter housing portion 203 through the top opening 204 is constrained within a chute 218 defined by a forward end wall 219 and lateral sidewalls

220. The forward end wall 219 extends downwardly from a forward end of the top opening 204 and terminates proximate the surface of the belt 212. As best viewed in FIG. 25, the lateral sidewalls 220 are disposed on each side of the belt 212 and extend downwardly from the top opening 204 below the belt 212. A rearward wall 221 includes a height-adjustable baffle 222 that may be selectively raised or lowered relative to the belt 212 as indicated by arrow 223 to regulate the amount of product carried rearwardly by the belt 212. It should be appreciated that by raising the baffle 222 relative to the belt 212, the amount of product passing under the baffle 222 and carried rearwardly by the belt 212 will increase. Conversely, by lowering the baffle 222 relative to the belt 212, less product will pass under the baffle 222 to be carried rearwardly by the belt 212. To adjust the height of the baffle 222 a lever 224 (FIG. 24) may extend through the front of the meter housing portion 203 to allow the operator to select a desired baffle height. Secondary sidewalls 225 are disposed on each side of the belt 212 and extend rearward of the rearward wall 221 to the end of the belt 212 in order to maintain the product on the belt until it is discharged from the end of the belt 212. The belt 212 may include treads 226 (FIG. 24) or intermittent raised surfaces to assist in carry the product rearwardly and to provide agitation to the product in the chute 218.

As previously referenced, the belt 212 is driven by the electric motor 216, such as a stepper motor, and drive mechanism 215. In the embodiment shown, the drive mechanism 215 includes a vertical drive shaft 228 that is coupled to the electric motor 216. The electric motor 216 rotates the vertical drive shaft 228 about its vertical axis. A first bevel gear 229 is mounted to a lower end of the vertical drive shaft 228. As best illustrated in FIG. 24, the first bevel gear 229 engages with a second bevel gear 230 mounted at one end of a horizontal drive shaft 231. A first drive sprocket 232 is mounted at a second end of the horizontal drive shaft 231. The horizontal drive shaft 231 may be separated between first and second horizontal drive shaft sections 231*a*, 231*b* by a clutch mechanism 250 for reasons discussed later. A second drive sprocket 233 is coupled to the drive roller 213 by a roller shaft 234 shaft. A drive belt 235 is disposed around the first and second drive sprockets 232, 233. Thus, it should be appreciated that rotation of the vertical drive shaft 228 by the electric motor 216 causes the first bevel gear 229 to engage with and rotate the second bevel gear 230. Rotation of the second bevel gear 230 causes rotation of the horizontal drive shaft 231, which, in turn causes rotation of the first drive sprocket 232 which drives rotation of the drive belt 235 and thus rotation of the second drive sprocket 233. Rotation of the second drive sprocket 233 drives rotation of the roller shaft 234 and the drive roller 213 rotationally fixed therewith. As the drive roller 213 rotates, it causes corresponding rotation of the belt 212 disposed around the drive roller 213 and idler roller 214. The foregoing drive mechanism 215 is but one exemplary arrangement. It should be appreciated that other drive mechanism arrangements may be equally suitable depending on the position and orientation of the electric motor 216, the position of the drive roller 212 or the configuration of the meter module 200.

The meter module 200A may include a flip gate 240 to prevent or minimize inadvertent spilling of the product from the meter module 200A during transport of the air cart 10 or when the meter module 200A is being removed from the metering bank 110. In the embodiment illustrated, the flip gate 240 is pivotally retained within the meter housing portion 203 toward a rearward end of the conveyor assembly 211. The flip gate 240 is movable as indicated by arrow 241 between a down position (shown in solid lines) and an up position (shown in dashed lines). During operation of the air cart 10, the flip gate 240 is disposed in the down position, wherein the flip gate 240 is oriented generally vertical such that the product conveyed rearwardly by the conveyor assembly 211 is able to pass through the outlet 206 and into the lower chamber portion 205. However, when the air cart 10 is not in operation, such as when the air cart is being transported between fields or when it is desired to remove the module 200 from the metering bank 110, the flip gate 240 may be pivoted to the up position as shown in dashed lines in FIG. 23. It should be appreciated that although the flip gate 240 is shown in the down position in FIG. 23, the flip gate 240 is shown in the up position in the cross-section view of FIG. 25 to illustrate the position of the flip gate 240 with respect to the belt 212. When in the up position, the flip gate 240 captures any product that may fall from the belt 212 when not desired, thereby preventing any inadvertent spilling of the product from the meter module 200A.

In one embodiment, as shown in FIGS. 23-25, the movement of the flip gate 240 is accomplished with a mechanical linkage operably coupling the flip gate 240 with the drive mechanism 215 and electric motor 216. The flip gate 240 is supported at the rearward end of the meter housing portion 203 by a hinge pin 242. The hinge pin 242 is rotationally fixed to the forward end of the flip gate 240 and to one leg of an L-shaped member 244. A rearward end of a rod 246 is connected to the other leg of the L-shaped member 244. A forward end of the rod 246 is connected to a lever arm 248 rotationally fixed to the first drive sprocket 232. Thus, in reference to FIG. 23, when the motor 216 is reversed causing counterclockwise rotation of the horizontal drive shaft 231 coupled to the first drive sprocket 232, the lever arm 248 rotates counterclockwise (as viewed in FIG. 23) exerting a pulling force on the rod 246 in the forward direction as indicated by the dashed lines in FIG. 23. The forward movement of the rod 246 forces the L-shaped member 244 and the hinge pin 242 rotationally fixed therewith, to rotate in the clockwise direction (as viewed in FIG. 23). Because the flip gate 240 is rotationally fixed to the hinge pin 242, the clockwise rotation of the hinge pin 24 causes the flip gate 240 to pivot upwardly from the down position to the up position as indicated by the dashed lines in FIG. 23. The flip gate 240 remains in the up position until the clutch mechanism 250 is disengaged. For example the flip gate 240 may be spring biased to return to the normally down position when the clutch mechanism 250 is disengaged. Alternatively, the clutch mechanism 250 may automatically disengage when the vertical drive shaft 228 is again rotated in the normal direction of rotation. Alternatively, the motor 216 may be programed to reverse rotation of the motor 216 to cause a partial reverse movement of the belt 212 upon receiving a command initiated by the operator of the air cart 10, thereby causing the flip gate 240 to move from the down position to the up position. For example, the motor 216 may be programmed to reverse direction when the operator raises the applicator implement at the end rows or headlands of field, shuts off the blower 62, overplant control (controller prevents overplant when GPS coordinates reach a position on a coverage map of an already planted field section), or other operation in which discharge of the product into the air tubes 64 or distribution lines of the applicator implement is not desired. It should be appreciated that movement of the flip gate 240 from the down position to the up position may be accomplished by any suitable means, including via a manual lever extending through the side of the housing 202

(not shown), by a direct drive actuator coupled to a pivot pin rotationally fixed to the flip gate 240 (not shown), or by any other suitable mechanism.

The meter module 200A may also employ product flow sensors and a calibration system as hereinafter described. Referring to FIG. 23, the lower chamber portion 205 may include internal structure, such as internal walls or baffles which guide or direct the product from the outlet 206 toward the bottom opening 208 of the meter module 200. In one embodiment, such internal structure may include a funnel structure 260 supported within the lower chamber portion 205 of the main housing 202. The funnel structure 260 may be comprised of sloped sidewalls 262 defining an open bottom end, wherein the sloped sidewalls direct or guide the product downwardly and forwardly toward the bottom opening 208 of the main housing 202.

Figure 27B:
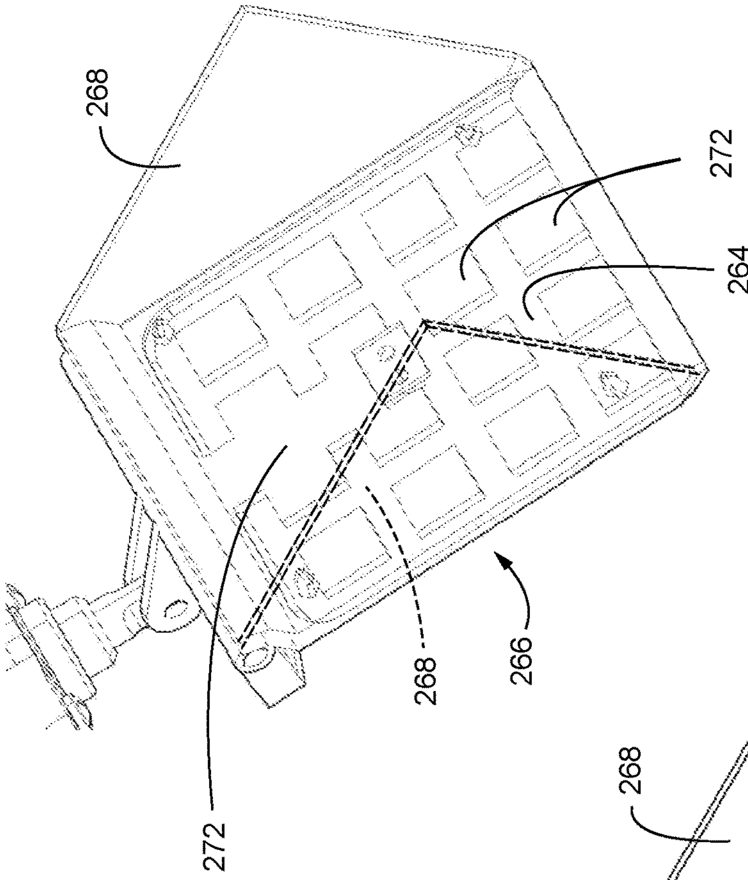
FIG. 27B is an enlarged perspective view of the chute structure of FIG. 27A, and showing an embodiment of the bottom plate instrumented with sensors.
Figure 27A:
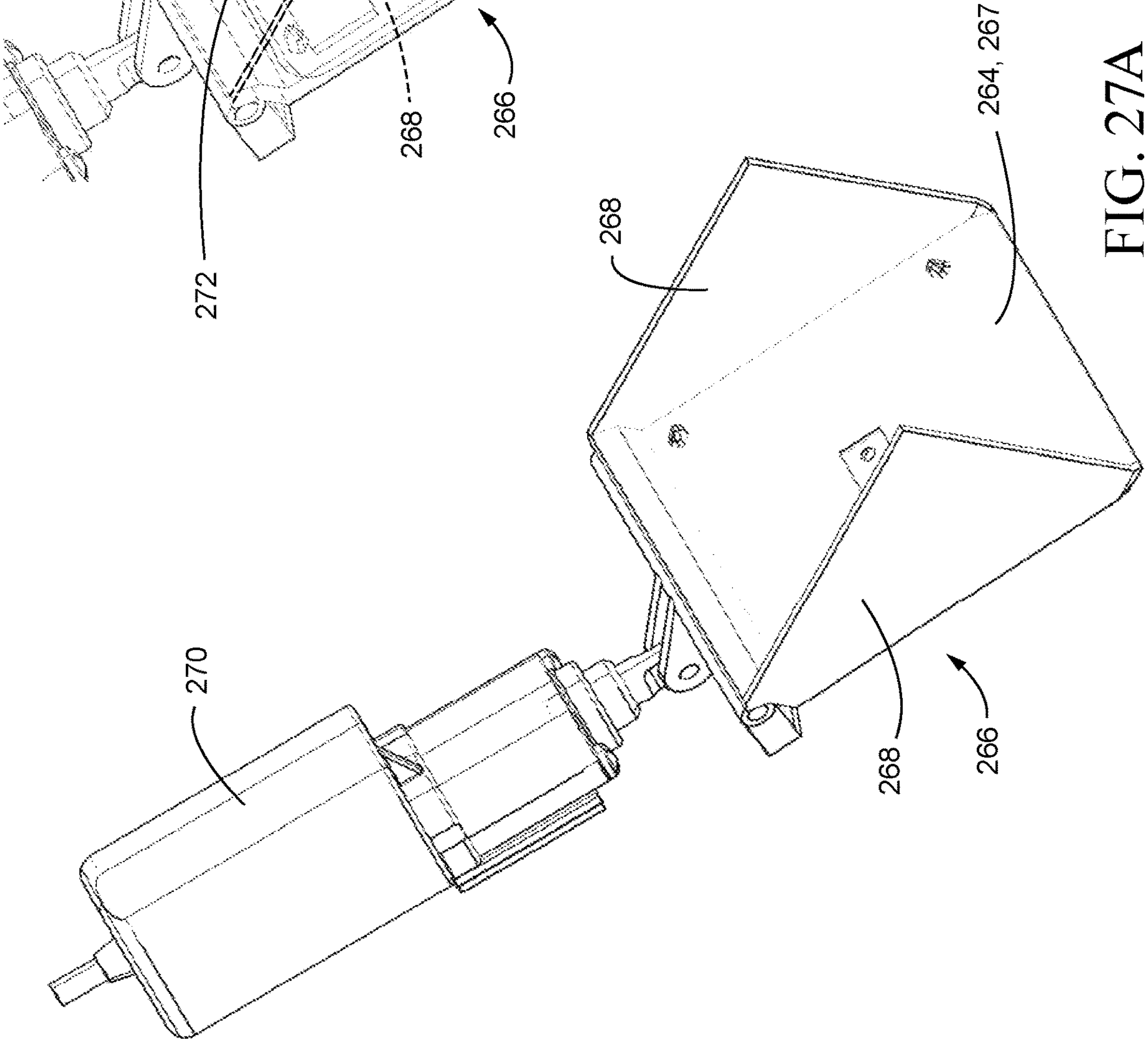
FIG. 27A is a perspective view of an embodiment of a chute structure.

The internal structure 260 may include a bottom plate 264 disposed at an angle relative to the direction of flow of the product flowing from the outlet 206 toward the bottom opening 208. The bottom plate 264 may be instrumented with impact or pressure sensors 272 such that the bottom plate 264 functions as a flow sensor. As illustrated in FIGS. 27 and 27A, the bottom plate 264 may include a plurality of impact or pressure sensors 272 arranged below a resilient, wear resistant, upper surface layer 267 (shown removed in FIG. 27A). The impact or pressure sensors 272 are configured to generate signals (such as voltage signals) corresponding in magnitude to the amount of product flowing over the surface of the plate 264. If the impact or pressure sensors 272 are not generating signals of sufficient magnitude, thereby indicating no-flow or low-flow volume of product through the meter module 200, an alarm condition may be initiated to alert the operator that a particular meter module 200 within the metering bank 110 is not operating properly. The operator may then stop operation and remove the meter module 200 from the metering bank 110 for inspection as previously described or to determine if there is an obstruction in the opening 158 of the tank funnel preventing the flow of product therethrough. In such an embodiment, it will be appreciated that the sensor plate 264 is in signal communication with the controller 510 and an integrated or separate monitor display screen visible to the operator in the cab of the tractor pulling the air cart. The signal communication may be wired or wireless.

In some embodiments, the signal magnitudes generated by the impact or pressure sensors 272 may be empirically correlated to volume or mass flow of the product, similar to the operation of a yield sensor commonly used on agricultural combine harvesters as is well known to those of ordinary skill in the art. Such empirically correlated volume or mass flow signal magnitudes may serve as a row-by-row application rate sensor of the product being applied. An example of a sensor correlating signal magnitudes to mass flow rates and volumetric flow rates is disclosed in U.S. Pat. No. 9,506,786 issued to Precision Planting LLC.

In alternative embodiments, rather than the bottom plate 264 being instrumented with impact or pressure sensors 272 to detect product flow, other types of sensors may be employed to detect product flow. Examples of alternative types of product flow sensors may include, optical sensors, piezoelectric sensors, microphone sensors, electromagnetic energy sensors, or particle sensors. In such alternative embodiments, utilizing optical sensors, piezoelectric sensors, electromagnetic sensors or particle sensors, the sensor elements may be disposed on opposing sidewalls 262 of the funnel structure or otherwise within the lower chamber portion 205 of the main housing 202 of the meter module 200 to detect the passage of product between the sensor elements. An example of a suitable optical sensor may be the type distributed by Dickey-John Corporation of Auburn, IL and disclosed in U.S. Pat. No. 7,152,540. An example of a suitable microphone sensor may be Recon Wireless Blockage System available from Intelligent Ag Solutions. An example of a suitable particle sensor may be the type disclosed in International Patent Publication No. WO2020194150 to Precision Planting LLC. An example of a suitable electromagnetic energy sensor, may be the type disclosed in U.S. Pat. No. 6,208,255, assigned to Precision Planting LLC.

In the embodiment illustrated in FIG. 23, the internal structure 260 may be comprised of two parts, including an upper funnel structure 265 having an open bottom end and a capture structure 266. As best illustrated in FIG. 27, the capture structure 266 may include sidewalls 268 extending upwardly from a bottom plate 264. As shown in FIG. 23, the capture structure 266 may be pivotally supported within the lower chamber portion 205 by an actuator 270 for movement as indicated by arrow 271 between a dump position, indicated by solid lines in FIG. 23, and a capture position, indicated by dashed lines in FIG. 23. The capture structure 266 may be instrumented with a load cell 274. When the capture structure 266 is in the dump position, product flow may be detected by the impact or pressure sensors 272 or by any of the alternative flow sensors as described above. In the capture position, the capture structure 266 covers or closes off the open bottom end of the upper funnel structure 265 to capture the metered product conveyed by the belt 212 which is then measured by the load cell 274 for calibration purposes as described later. As non-limiting examples, the load cell 274 may be configured to measure strain due to bending or shear forces, such as a beam-type load cell or load pin-type load cells. As the product is captured by the capture structure 266 in the capture position, the load cell 274 generates a signal magnitude in proportion to the amount of strain in the load cell 274 due to the captured product. As described later, the signals generated by the load cell 274 are received by the controller 510 which then correlates the signal magnitude to the weight of the product captured. The capture structure 266 may also be moved to the capture position when the air cart 10 is being transported or when the meter module 200A is being removed from the metering bank 110 to prevent or minimize inadvertent spilling or release of the product that may remain on the belt 212 or in the meter housing portion 203.

Figure 26:
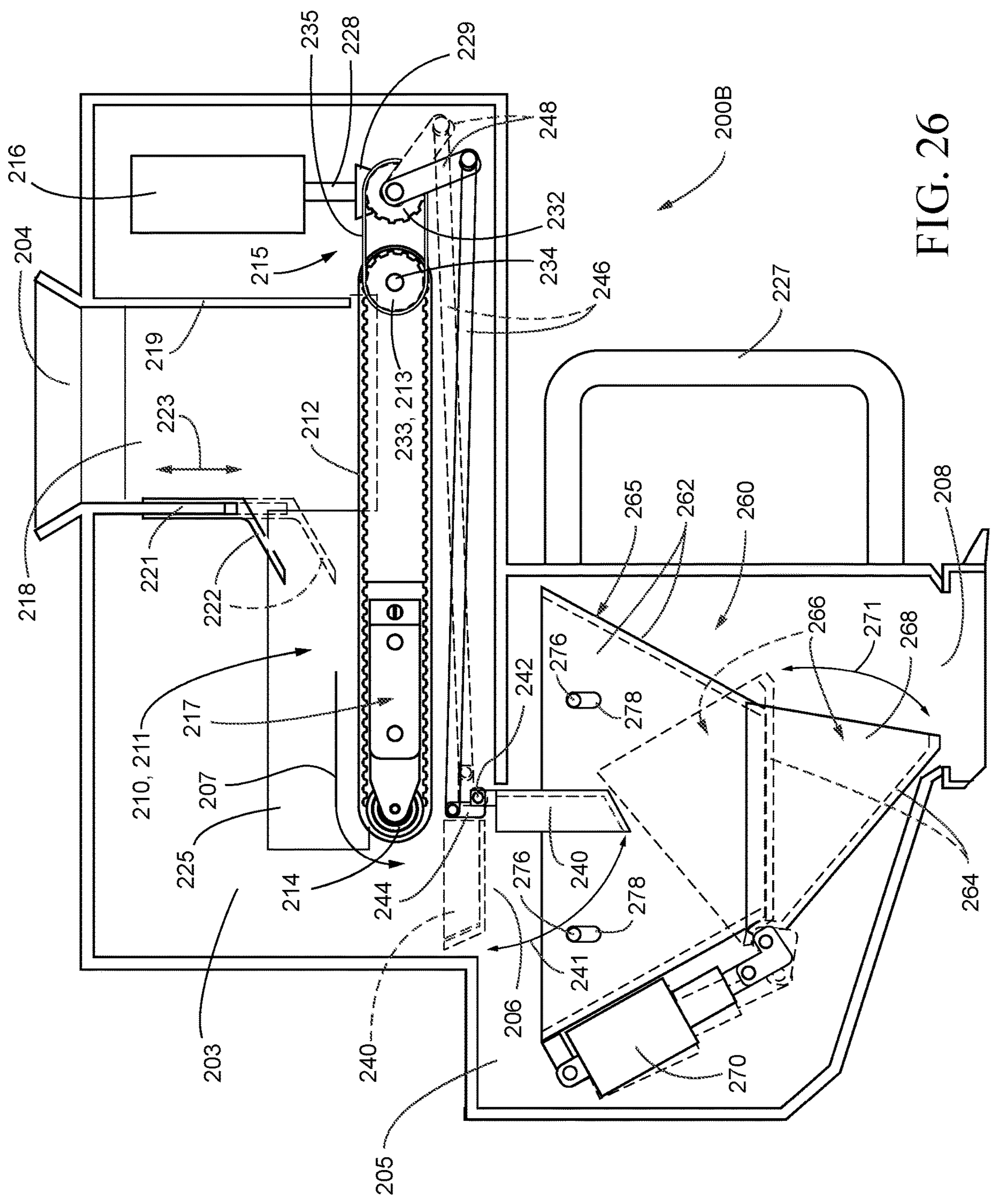
FIG. 26 is a left side elevation view of another embodiment of a meter module with the left sidewall of the main housing removed to show the internal components thereof and showing movement of some of the internal components.

FIG. 26 is a side elevation view of another embodiment of a meter module 200B. The embodiment of meter module 200B is shown as being substantially the same as the embodiment of meter module 200A. As with the embodiment of the meter module 200A, the embodiment of the meter module 200B may include internal structure 260 comprised of two parts, including an upper funnel structure 265 and a capture structure 266. The capture structure 266 may include sidewalls 268 extending upwardly from a bottom plate 264. The bottom plate 264 may be instrumented with impact or pressure sensors 272 as previously described. However, in this embodiment, the capture structure 266 is hingedly attached to the upper funnel structure 265 and is movable by an actuator 270 mounted on the upper funnel structure 265. The actuator 270 moves the capture structure 266 as indicated by arrow 271 between a dump position, indicated by solid lines in FIG. 26, and a capture position, indicated by dashed lines in FIG. 26. As in the previous embodiments, when the capture structure 266 is in the dump position, product flow may be detected by the impact or pressure sensors 272 on the bottom plate 264 as described above or by any of the other flow sensors described above. In the capture position, the capture structure 266 covers or closes off the open bottom end of the upper funnel structure 265 to capture the metered product conveyed by the belt 212 for calibration purposes described later. Additionally, as previously described, the capture structure 266 may be moved to the capture position when the air cart 10 is being transported or when the meter module 200B is being removed from the metering bank 110 to prevent or minimize inadvertent spilling or release of the product that may remain on the belt 212 or in the meter housing portion 203.

In this embodiment, the upper funnel structure 265 (to which the capture structure 266 and actuator 270 are mounted) is supported within the lower chamber portion 205 via one or more load cells 276 for weighing a sample of the product during the calibration operation described later. The type of load cells 276 used to weigh the product captured by the capture structure 266 in the capture position, may vary depending on the manner in which the funnel structure 265 is supported within the lower chamber portion 205. As non-limiting examples, the load cells 276 may be configured to measure tension or compression, such as a canister-type load cells utilizing a spring element or S-type load cells. Alternatively, the load cells 276 may be configured to measure strain due to bending or shear forces, such as a beam-type load cell or load pin-type load cells. In FIG. 26, beam-type load cells 276 are shown supporting the funnel structure 265. The beam load cells 276 project laterally inwardly from the sidewalls of the lower chamber portion 205 of the main housing 202 and are received within vertical slots 278 in the lateral sidewalls 262 of the funnel structure 265. As the product sample is captured by the capture structure 266 in the capture position, the load cells 276 generate a signal magnitude in proportion to the amount of strain in the load cell due to the captured product. As described later, the signals generated by the load cells 276 are received by the controller 510 which then correlates the signal magnitude to the weight of the captured product.

An advantage of the modular metering system 100 is that the meter modules 200 may be made entirely or substantially of corrosion resistant plastic (e.g., polypropylene, PVC, HDPE, UHMW, PTFE) or other corrosion material, including the main housing 202, the internal structure 260, including the funnel 265 and capture structure 266 if used, as well as the belt 212 and rollers 213, 214 of the conveyor assembly 211. Thus, each meter module 200 should have a longer life than most commercially available metering systems and if any meter module becomes corroded, or fails, it may be easily removed for servicing or replaced with a new meter module 200 as previously explained.

Control System

Figure 3:
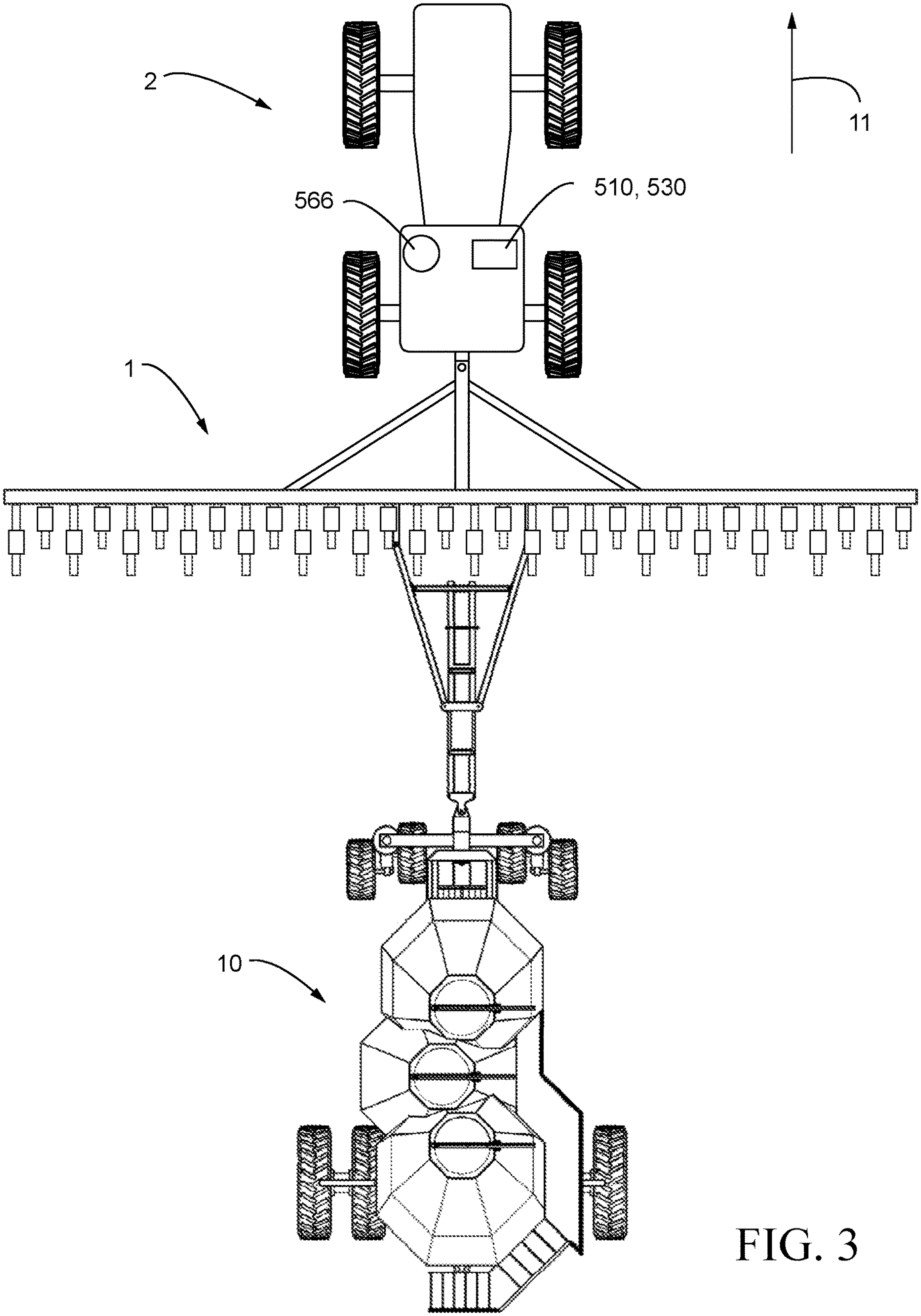
FIG. 3 is a top plan view of the air cart of FIG. 1 shown attached to an applicator implement drawn by a tractor.
Figure 28:
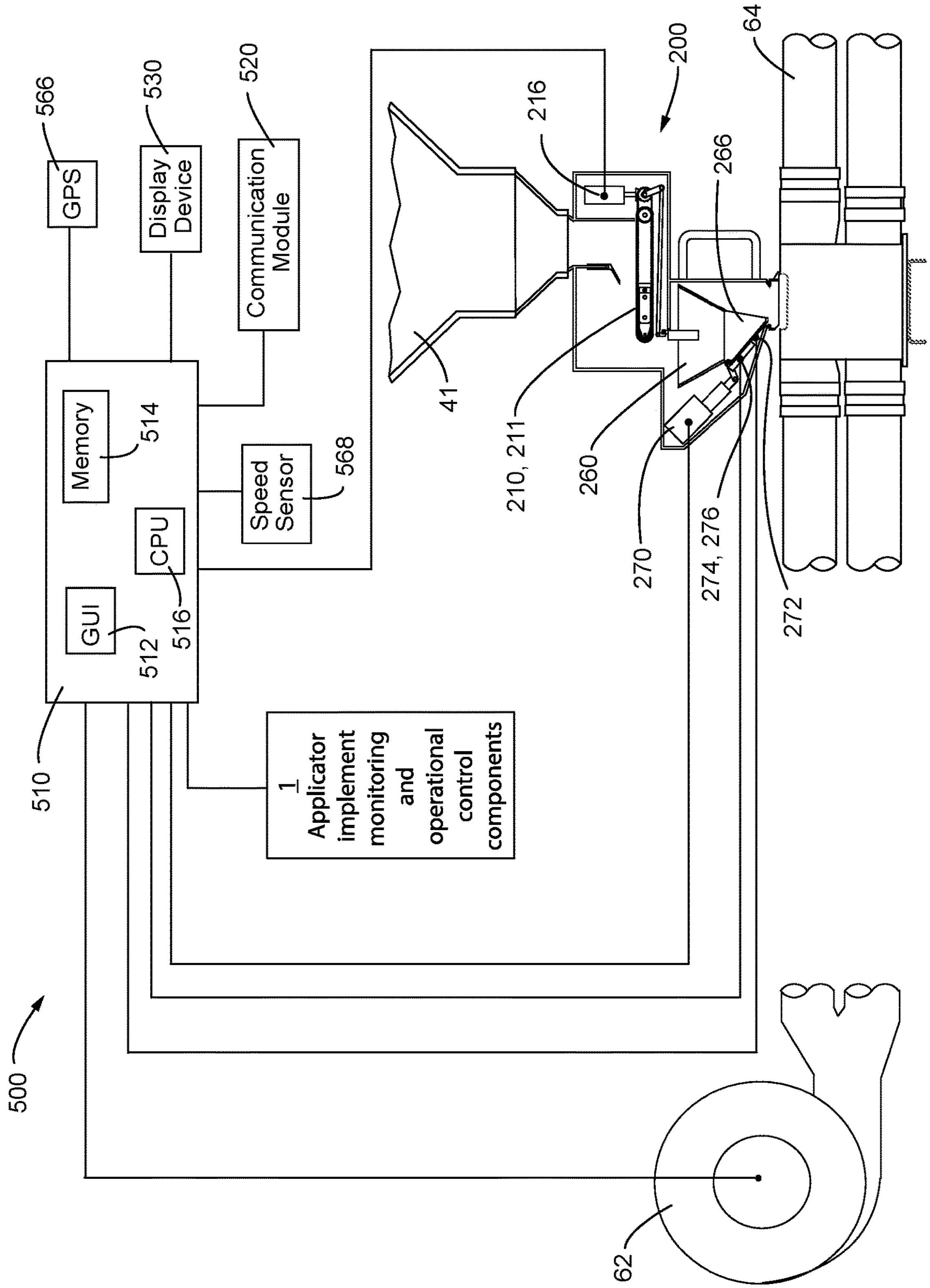
FIG. 28 is a schematic illustration of the controller in signal communication with various components of the modular metering system and applicator implement.
Figure 29:
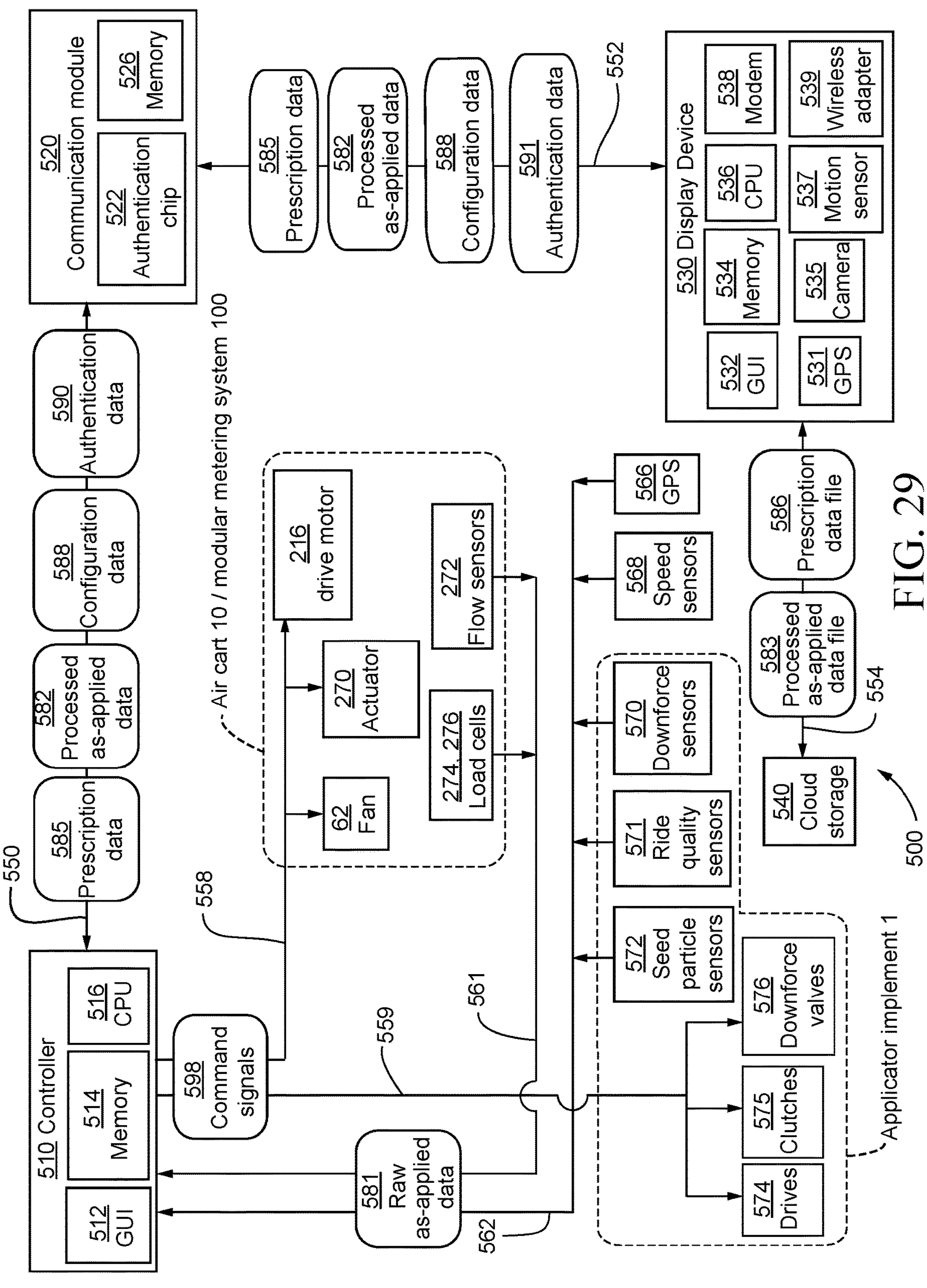
FIG. 29 is an embodiment of a diagram of the control system for the modular metering system.

Referring to FIGS. 3, 28 and 29, the control system 500 includes a controller 510, such as the 20/20 monitor available from Precision Planting LLC, 23207 Townline Road, Tremont, IL 61568. As previously identified, the controller 510 may be in signal communication with a communication module 520, a display device 530, a global position system (GPS) 566 and a speed sensor 568 associated with the tractor 2 or applicator implement 1. The GPS 566 provides the controller 510 with a real time georeferenced location of the applicator implement 1 and tractor 2 within a field during field operations. The speed sensor 568 provides a speed of the applicator implement 1 or the tractor 2. The speed sensor may be the tractors speedometer or a separate speed sensor disposed on the applicator implement 1 or tractor 2. The display device 530 and controller 510 may be mounted in the cab of the tractor 2 (FIG. 3) for viewing and interacting by the operator during configuration and during field operations. The controller 510 may also be in signal communication with the components of the metering system 100, including the fan 62 and each of the meter modules 200, including each of their respective product flow sensors 272 (or other flow sensors discussed above), load cells 274, 276, chute actuators 270, and conveyor drive motors 216. The controller 510 may also be in signal communication with the various components of the applicator implement 1 as discussed below.

FIG. 29 is a schematic illustration of an embodiment of the control system 500. The controller 510 may include a graphical user interface (GUI) 512, memory 514 and a central processing unit CPU 516. The controller 510 may be in signal communication with the communication module 520 via a harness 550. The communication module 520 may include an authentication chip 522 and memory 526. The communication module 520 may be in signal communication with the display device 530 via a harness 552. The display device 530 may include a GUI 532, memory 534, a CPU 536 and may connect to a cloud-based storage server 540 via a wireless Internet connection 554. One such wireless Internet connection 554 may comprise a cellular modem 538. Alternatively, the wireless Internet connection 554 may comprise a wireless adapter 539 for establishing an Internet connection via a wireless router.

The display device 530 may be a consumer computing device or other multi-function computing device. The display device 530 may include general purpose software including an Internet browser. The display device 530 may include a motion sensor 537, such as a gyroscope or accelerometer, and may use a signal generated by the motion sensor 537 to determine a desired modification of the GUI 532. The display device 530 may also include a digital camera 535 whereby pictures taken with the camera 535 may be associated with a GPS position, stored in the memory 534 and transferred to the cloud storage server 540. The display device 530 may also include a GPS receiver 531.

Figure 30:
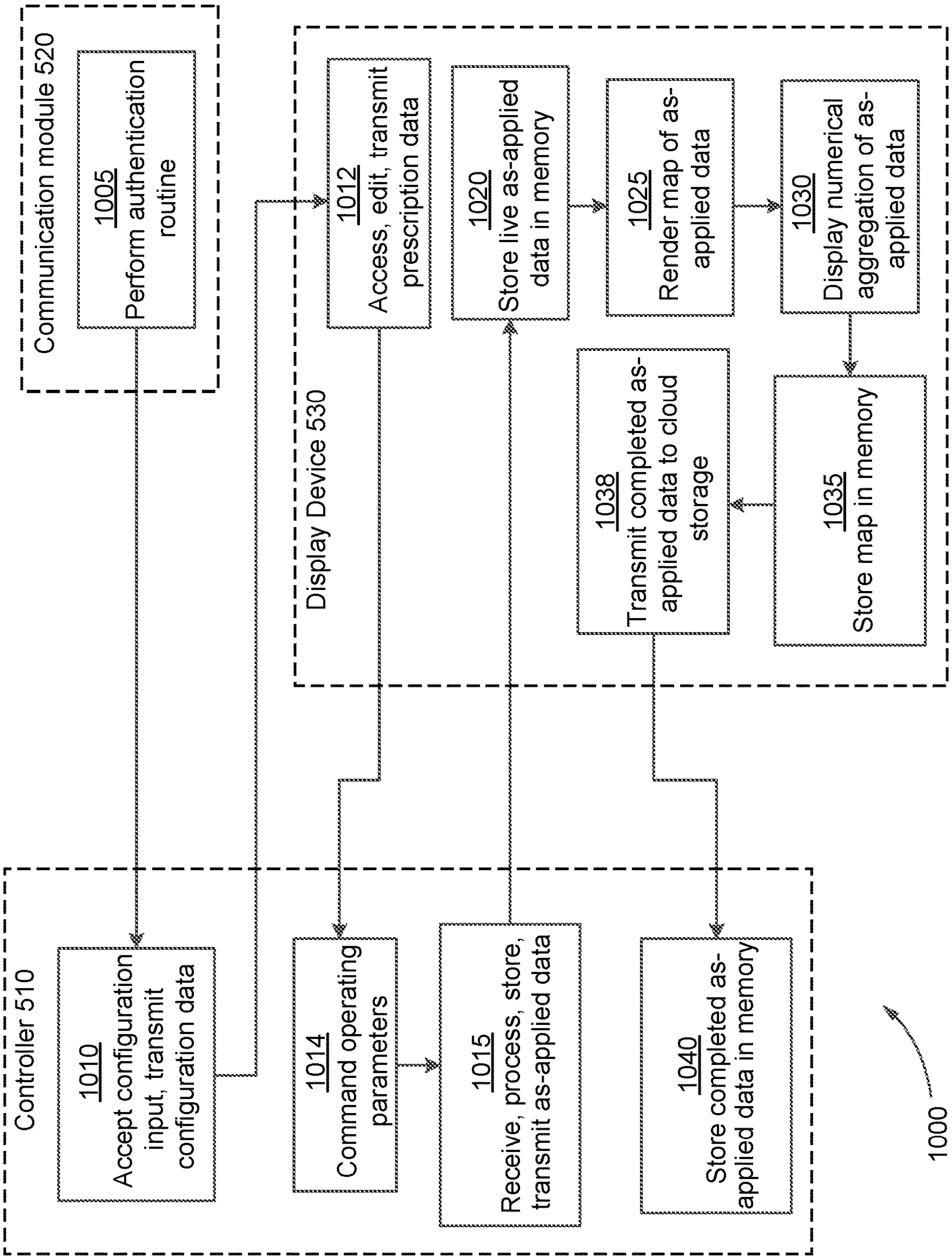
FIG. 30 is a diagram of a process for setting up and controlling the modular metering system and for storing and mapping operational data.

In operation, referring to FIG. 29 in combination with FIG. 30, the control system 500 may carry out a process designated generally by reference numeral 1000. At step 1005, the communication module 520 may perform an authentication routine in which the communication module 520 receives a first set of authentication data 590 from the controller device 510 and the authentication chip 522 may compare the authentication data 590 to a key, token or code stored in the memory 526 of the communication module 520 or which is transmitted from the display device 530. If the authentication data 590 is correct, the communication module 520 may transmit a second set of authentication data 591 to the display device 530 such that the display device 530 permits transfer of other data between the controller 510 and the display device 530 via the communication module 520.

At step 1010, the controller 510 accepts configuration input entered by the operator via the GUI 512. In some embodiments, the GUI 512 may be omitted and configuration input may be entered by the operator via the GUI 532 of the display device 530. The configuration input may comprise parameters including the number of row units of the applicator implement 1, the row unit spacing, dimensional offsets between the GPS receiver 566 and the row units of the applicator implement 1, the number of meter modules 200 in each metering bank 110, the number of metering banks 110, the amount and type of product in each tank 40 associated with each metering bank 110, the time from meter module 200 to the time seed reaches the seed trench (such as is described in PCT Publication No. WO2012/015957), etc. The controller 510 is configured to transmit the resulting configuration data 588 to the display device 530 via the communication module 520.

At step 1012, the display device 530 may access prescription data files 586 from the cloud storage server 540. The prescription data files 586 may include a file (e.g., a shape file) containing geographic boundaries (e.g., a field boundary) and relating geographic locations (e.g., GPS coordinates) to operating parameters (e.g., product application rates). The display device 530 may allow the operator to edit the prescription data file 586 using the GUI 532. The display device 530 may reconfigure the prescription data file 586 for use by the controller 510 and may transmit the resulting prescription data 585 to the controller 510 via the communication module 520.

At step 1014, while traversing the field with the air cart 10 and applicator implement 1 during field application operations, the controller 510 may send command signals 598 via harness 558 to the components of the air cart 10 providing operational control, including to the fan 62, the chute actuators 270 and conveyor drive motor 216. These command signals 598 may include signals for engaging and disengaging the fan 62, for setting the speed or air flow of the fan 62, to actuate the actuators 270 to move the capture structure 266 between the dump position and the capture position, for engaging and disengaging rotation of the conveyor drive motors 216, and for varying the speed of rotation of the conveyor drive motors 216. The controller 510 may also send command signals 598 via harness 559 to the components of the applicator implement 1 providing operational control, including to the various drives 574, clutches 575, downforce valves/actuators 576 and any other components of the applicator implement providing operational control.

At step 1015, as the applicator implement 1 traverses the field, the controller 510 receives raw as-applied data 581 from the modular metering system 100 and air cart 10 via harness 561 and from the applicator implement 1 via harness 562. The raw as-applied data 581 from the modular metering system 100 and air cart 10 may include signals from the flow sensors 272 (or other flow sensors as described herein), the load cells 274, 276 and any other monitored components of the modular metering system 100 and air cart 10. The raw as-applied data 581 from the applicator implement 1, may include signals from downforce sensors 570, ride quality sensors 571, seed or particle sensors 572 or any other monitored components of the applicator implement 1. In addition, the raw as applied data 581 may include signals from the GPS 566 and speed sensors 568 associated with the applicator implement 1 or the tractor 2. The controller 510 processes the raw as-applied data 581, and stores the as-applied data to the memory 514. The controller 510 may transmit the processed as-applied data 582 to the display device 530 via the communication module 520. The processed as-applied data 582 may be streaming, piecewise, or partial data. It should be appreciated that according to the method 1000, control of the modular metering system 100 and air cart 10, and the applicator implement 1 and data storage are performed by the controller 510 such that if the display device 530 stops functioning, is removed from the control system 500, or is used for other functions, the operation of the modular metering system 100 and air cart 10, the implement 1 and essential data storage are not interrupted.

At step 1020, the display device 530 receives and stores the live processed as-applied data 582 in the memory 534. At step 1025, the display device 530 may render a map of the processed as-applied data 582 (e.g., an application rate map) as described below. At step 1030, the display device 530 may display a numerical aggregation of as-applied data (e.g., pounds of product applied over the last 5 seconds). At step 1035, the display device 530 may store the location, size and other display characteristics of the application map images rendered at step 1025 in the memory 534. At step 1038, after completing application operations, the display device 530 may transmit the processed as-applied data file 583 to the cloud storage server 540. The processed as-applied data file 583 may be a complete file (e.g., a data file). At step 1040 the controller 510 may store completed as-applied data (e.g., in a data file) in the memory 514. The method of mapping and displaying the as applied data 582 may be the same or similar to the as-applied data maps disclosed in U.S. Pat. No. 9,699,958.

Calibration

Figure 31:
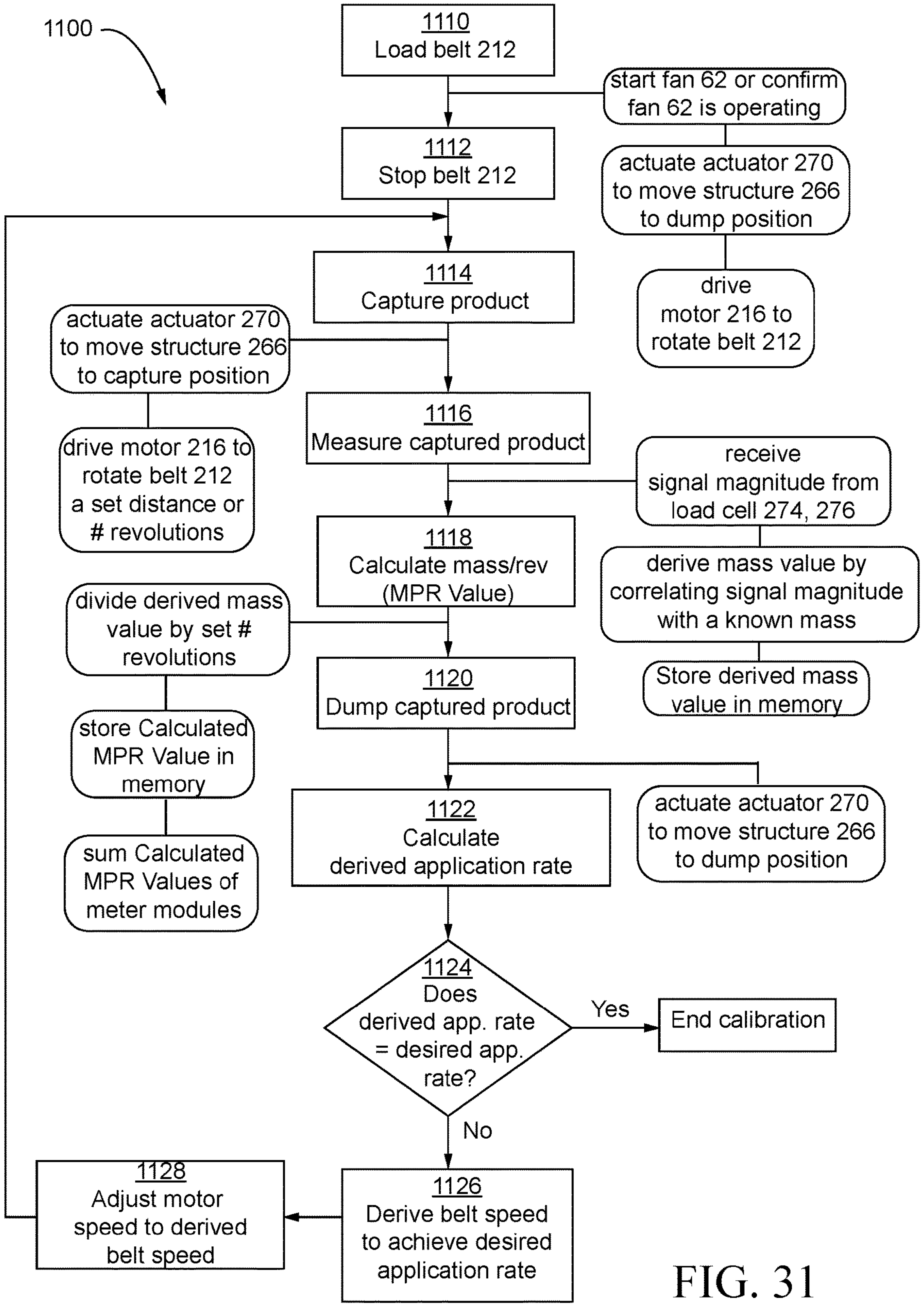
FIG. 31 is a flow chart of a process for calibrating the modular metering system.

Referring to FIG. 31, the control system 500 may carry out a process designated generally by reference numeral 1100. After ensuring that the slide gates 160 are in the open position such that product flows from the tank 40 through the tank funnel 150 and into the top opening 204 of the meter modules 200, the operator initiates the "load belt" step 1110 to load or fill the belt 212 of each meter module 200 in the metering bank 110 in preparation for the subsequent calibration steps. The load belt step 1110 may be initiated by the operator selecting a load belt selection displayed on the GUI 532 of the display device or on the GUI 512 of the controller 510. Upon initiating the load belt step 1110, the controller 510 commands the fan 62 to operate at a predetermined speed to produce a predetermined air flow or controller 510 determines whether fan 62 is operating (fan 62 can be operated by a controller on the tractor, in which fan 62 is controlled by the tractor's hydraulic circuit. The controller 510 also commands the actuators 270 to move the capture structure 266 to the dump position so that any product conveyed by the belts 212 while charging will flow out the bottom opening 208 of the meter module, through the corresponding diverter gate module 400 and into the corresponding air tube module 300 before being carried away by the air flow through the air tubes 64 and into the distribution lines of the applicator implement 1. The controller 510 also commands the drive motors 216 to rotate for a predetermined time period or predetermined number of rotations to ensure that the length of the belts 212 are filled with product.

Upon the belts 212 being fully loaded with product, the "stop belt" step 1112 is triggered to stop the motor 216 and belt 212 from rotating. In one embodiment, the stop belt step 1112 may be automatically triggered upon the flow sensors 272 generating signals indicating that each belt 212 is discharging a consistent flow of product. Alternatively, the operator may trigger the stop belt step 1112 by selecting a stop belt selection displayed on the GUI 532 or 512. Once the belts 212 are fully loaded and the stop belt step 1112 has been triggered, the "product capture" step 1114 is initiated. The product capture step 1114 may be initiated automatically by the controller 510 after completing the stop belt step 1112 or the operator may initiate the product capture step 1114 by selecting a product capture selection displayed on the GUI 532 of the display device or on the GUI 512 of the controller 510.

In the product capture step 1114, the fan 62 continues to operate at the predetermined speed, the controller 510 commands the actuators 270 to move the capture structure 266 to the capture position to close off the open bottom end of the upper funnel structure 265. Once the capture structure 266 is in the capture position, the controller 510 commands the drive motor 216 to rotate the belt a predetermined distance or a predetermined number of revolutions (e.g., one complete belt revolution) at a default or predetermined belt speed. In one embodiment the predetermined distance or predetermined number of revolutions may be a single belt revolution since only a nominal amount of product is needed to obtain an accurate measurement using the load cells 274, 276 (e.g., 1 pound or 454 grams by weight which may be approximately 4 cups or one liter by volume of the product). The product captured is then measured at the "measure" step 1116. The product capture step 1116 may be initiated automatically by the controller 510 after the predetermined distance or predetermined number of belt revolutions or the operator may initiate the measure step 1116 by selecting a measure selection displayed on the GUI 532 of the display device or on the GUI 512 of the controller 510.

In the measure step 1116, the signal magnitude generated by the load cell 274, 276 may be correlated with a known mass value via a look-up table to obtain a derived mass value. The derived mass value is stored in memory 514. After completing the measure step 1116, the "mass per revolution calculation" step 1118 is initiated. The mass per revolution calculation step 1118 may be initiated automatically by the controller 510 after completing measure step 1116 or the operator may initiate the mass per revolution calculation step 1118 by selecting a mass per revolution calculation selection displayed on the GUI 532 of the display device or on the GUI 512 of the controller 510.

In the mass per revolution calculation step 1118, it is assumed that the product in the tank 40 is flowing freely into the top opening 204 of the meter module 200 being calibrated. Thus, once the belt 212 has been fully loaded, the volume and mass of the product carried by the belt 212 will remain substantially consistent. Accordingly, the mass per revolution may be calculated by dividing the derived mass value from step 1116 by the number of predetermined belt revolutions (e.g., one full belt revolution). The resulting mass per belt revolution value ("MPR Value") may be displayed to the operator on the GUI 532 or 512 and stored in memory 514. At any time after the measure sample step 1116 is completed, the "dump" step 1120 may be initiated. The dump step 1120 may be performed automatically upon completion of the measure step 1116 or mass per revolution calculation step 1118 or the operator may initiate the dump step 1120 by selecting a dump selection displayed on the GUI 532 of the display device or on the GUI 512 of the controller 510. In the dump step 1120, the controller 510 may command the actuator 270 to actuate to move the capture structure 266 to the dump position to dump or release the captured product through the bottom opening 208.

After calculating the MPR Value at step 1118, the MPR Value is used to derive the application rate at step 1122. It should also be appreciated that the MPR Value is for one meter module 200. Thus, the MPR Values across all meter modules 200 in the metering bank 110 metering the same product (which in this example is assumed to be all of the meter modules 200 within a metering bank 110) may be summed or the MPR Value from one meter module 200 may be multiplied by the number of meter modules within the meter bank 110 metering the same product to determine the total mass of the product metered in one belt revolution of each of the meter modules 200 of a metering bank 110. The MPR Value sum may be used to derive an application rate based on the following equation:

$$AR = \frac{\left(\sum MPR \text{ Values}\right) \times BS}{GS \times W} \times C$$

Where:

BS=belt speed (revolutions per minute)

AR=application rate (lbs/acre) or (kg/hectare)

C=conversion factor for imperial units C=495 (i.e., 60 min/hour×43560 $ft^2$/acre÷5280 ft/mile)

for SI units C=600 (i.e., 60 min/hour×10,000 $m^2$/hectare÷1000 m/km)

Σ MPR Values=sum of MPR Values from step 1118 (lbs/rev) or (kg/rev)

GS=ground speed of applicator implement (miles/hour) or (km/hr)

W=width of applicator implement (ft) or (m)

The belt speed (BS) is known from the predetermined or preset speed under step 1114. The width (W) of the applicator implement 1 is known and may have been previously input by the operator and stored in memory 114 during the during the configuration stage (step 1010 of FIG. 34). A ground speed of the applicator implement (GS) may be assumed by the operator and may have been previously input by the operator stored in memory during the configuration stage (step 1010 of FIG. 34). Thus, with all the variables retrieved from memory, the application rate may be derived using the above equation (the "Derived AR"). The Derived AR may then be compared at step 1124 to the desired application rate retrieved from memory and input during the configuration stage (e.g., based on a prescription map).

If the Derived AR matches the desired application rate (within a predetermined acceptable tolerance), no adjustment to the speed of the electric motor 216 (and thus the speed of the belt 212) is necessary and the calibration process 1100 may be ended. If the Derived AR does not match the desired application rate (within a predetermined acceptable tolerance) the speed of the electric motor 216 (and thus the speed of the belt 212) may be increased or decreased to achieve the desired application rate. At step 1126, the belt speed required to achieve the desired application may be derived based on the same equation above, but this time solving for belt speed (BS) rather than application rate (AR) as represented below.

$$BS = \frac{(AR \times W)}{\left(\sum MPR \text{ Values}\right) \times GS \times C)}$$

The controller 510 may be programmed with the above equation to automatically calculate or derive the belt speed to achieve the desired application rate using the sum of the MPR Values from step 1118 retrieved from memory and the desired application rate (AR), the ground speed (GS) and applicator implement width (W) input during the configuration state (step 1010 of FIG. 34) and retrieved from memory 114. At step 1128, once the derived belt speed is calculated at step 1126, the controller may be programmed to automatically set the motor speed to achieve the derived belt speed. Alternatively, the controller may display the derived belt speed to the operator on the display device 530 and the operator may set the motor speed to match the derived belt speed via the GUI 532 or 512.

After adjusting the motor speed at step 1128, a second calibration cycle may be repeated by selecting a verify calibration selection via the GUI 532 or 512. The verify calibration process may begin at step 1114 because it should be appreciated that belt 212 will already be fully loaded with product from the initial calibration cycle so the load belt step 1110 is not necessary. Likewise, the stop belt step 1112 is not necessary when performing the calibration verification process because the belt 212 was previously stopped after completing step 1114 in the initial calibration cycle (i.e., after the present number of belt revolutions was completed).

Once the modular metering system is calibrated, the controller 510 may automatically adjust the rotational speed of the electric motor 216 based on the above or similar equations to match the desired application rate as the ground speed of the applicator implement 1 varies or as the applicator implement 1 passes over prescription map boundaries having different application rates. For example, it should also be appreciated that because each meter module 200 has its own belt 212 and electric motor 216, each meter module 200 or group of meter modules 200 may be associated with one or more row units on the applicator implement 1. Thus, if the applicator implement 1 turns within a field resulting in the outermost row units away from the direction of the turn traveling at a greater ground speed than the innermost row units toward the direction of the turn, the controller 510 may command the electric motors 216 of the meter modules 200 associated with the outermost row units to rotate at a greater speed so as to meter more product to maintain an adequate supply of product through the distribution lines feeding the outermost row units that will require more product to maintain the desired application rate at their greater speed. Likewise, the controller 510 may command the electric motors 216 of the meter modules associated with the innermost row units to rotate at a slower speed to meter less product so as to not overload the distribution lines feeding the innermost row units that will require less product to maintain the desired application rate at their slower speed. Similarly, as different row units across the width of the applicator implement 1 pass over prescription map boundaries within a field having different application rates, the controller 510 may command the electric motors 216 of the meter modules 200 associated with the respective row units to increase or decrease in speed to ensure the amount of product being metered into the distribution lines is adequate without starving or overloading the distribution lines feeding the different row units applying product at differing application rates.

It should also be appreciated that one advantage of the modular metering system 100 and the calibration system and process 1100 described above and utilizing the automated capture structure 266, load cells 274, 276 and a single or minimal number of belt revolutions, is that it produces a sample of product for calibration purposes that is very small (approximately 1 pound or 454 grams by weight or 4 cups by volume) while still producing accurate measurements for the calibration. This small sample size is easily dispensed and distributed through the air tubes 64 and distribution lines of the applicator implement without concern of overfilling the distribution lines. This is a significant advantage over current commercially available air carts which produce collection samples in excess of 20 pounds of product which must be collected in collection bags that are physically attached to the metering systems, then removed, weighed, and dumped back into the tanks of the air carts as described in the Background above.

It should also be appreciated that the entire calibration process 1100 described above is performed by the operator from the cab of the tractor by simply selecting the calibration selection via the GUI 532 of the Display Device 530 or the GUI 512 of the controller 510 to initiate the steps of the calibration process. Thus, the calibration process 1100 for the modular metering system 100 is much quicker, more efficient and requires no physical effort, unlike calibration processes for other air carts on the market, which require multiple manual and physical steps as described in the Background section of this disclosure.

EXAMPLES

The following are non-limiting examples.

Example 1—A meter module for metering a product in communication with the meter module, the meter module comprising: a main housing having a meter housing portion and a lower chamber portion, the meter housing portion having a top opening proximate a first end of the meter housing portion through which the product enters the meter housing portion, the meter housing portion including an outlet proximate a second end of the meter housing portion, the outlet in communication with the lower chamber portion, the lower chamber portion having a bottom opening; a metering mechanism disposed within the meter housing portion and extending between the top opening and the outlet; an electric motor operably coupled to the metering mechanism to drive the metering mechanism; whereby as the metering mechanism is driven by the electric motor, the metering mechanism meters the product into the lower chamber portion, the metered product exits the lower chamber portion through the bottom opening.

Example 2—the meter module of Example 1, wherein the metering mechanism is a conveyor assembly comprising a belt disposed around longitudinally spaced rollers.

Example 3—the meter module of Example 1, further comprising: a flip gate pivotally disposed in the meter housing portion, the flip gate pivotally movable between a down position and an up position, whereby in the down position the metered product passes through the outlet into the lower chamber portion, and whereby in the up position, the product within the meter housing portion is retained by the flip gate and is prevented from passing through the outlet into the lower chamber.

Example 4—the meter module of Example 3, wherein the flip gate is coupled to the metering mechanism by a linkage, such that reverse rotation of the metering mechanism causes the flip gate to move from the down position to the up position.

Example 5—the meter module of Example 4, wherein the reverse rotation is a one quarter rotation of the metering mechanism.

Example 6—the meter module of Example 1, wherein the lower chamber portion includes internal structure to direct the metered product through the lower chamber portion toward the bottom opening.

Example 7—the meter module of Example 6, wherein the internal structure includes a funnel structure having an open bottom end.

Example 8—the meter module of Example 7, wherein the internal structure further includes a capture structure.

Example 9—the meter module of Example 8, wherein the capture structure is movable between a dump position and a capture position, wherein in the dump position the capture structure directs the metered product toward the bottom opening, and wherein in the capture position, the capture structure closes off the open bottom end of the funnel structure so as to capture the metered product.

Example 10—the meter module of Example 9, further comprising an actuator, the actuator configured to move the capture structure between the dump position and the capture position.

Example 11—the meter module of Example 10, further comprising a load cell configured to generate a signal indicative of a mass of the metered product captured by the capture structure in the capture position.

Example 12—the meter module of Example 11, wherein the load cell is disposed on a bottom plate of the capture structure.

Example 13—the meter module of Example 11, wherein the load cell supports the funnel structure.

Example 14—the meter module of Example 1, further comprising: a flow sensor disposed within the lower chamber portion, the flow sensor configured to generate a signal indicative of the metered product passing through the lower chamber portion before exiting through the bottom opening.

Example 15—the meter module of Example 14, wherein the flow sensor is selected from the group consisting of: optical sensors, piezoelectric sensors, microphone sensors, electromagnetic energy sensors, or particle sensors.

Example 16—the meter module of Example 14, further comprising: a flow sensor, the flow sensor configured to generate a signal indicative of the metered product passing through the capture structure before exiting through the bottom opening.

Example 17—the meter module of Example 16, wherein the flow sensor is selected from the group consisting of: optical sensors, piezoelectric sensors, microphone sensors, electromagnetic energy sensors, or particle sensors.

Example 18—the meter module of Example 17, wherein the flow sensor includes an instrumented bottom plate of the capture structure, whereby the instrumented plate detects whether product is flowing over an upper surface of the instrumented plate in the dump position.

The foregoing description and drawings are intended to be illustrative and not restrictive. Various modifications to the embodiments and to the general principles and features of the modular metering system and meter modules, and processes described herein will be apparent to those of skill in the art. Thus, the disclosure should be accorded the widest scope consistent with the appended claims and the full scope of the equivalents to which such claims are entitled.

The invention claimed is:

1. One of a plurality of meter modules, each adapted to be removably receivable as a single unit from a metering bank of an air cart, each one of the plurality of meter modules comprising:

a main housing defining an enclosure having a configuration for seating within the metering bank, the main housing having a meter housing portion and a lower chamber portion, the meter housing portion having a top opening proximate a first end of the meter housing portion through which a product enters the meter housing portion, the meter housing portion including an outlet proximate a second end of the meter housing portion, the outlet in communication with the lower chamber portion, the lower chamber portion having a bottom opening;

a meter disposed within the meter housing portion, whereby the product entering the meter housing portion through the top opening is received by the meter;

an electric motor disposed within the main housing, the electric motor operably coupled to the meter to drive rotation of the meter in a direction of rotation;

whereby, the main housing together with the meter and electric motor disposed within the main housing is slidably removable from the metering bank as a single unit;

whereby, when the main housing is seated within the metering bank, and as the meter is driven by the electric motor in the direction of rotation, the product received by the meter is carried by the meter toward the outlet of the meter housing portion, such that the product is metered into the lower chamber portion, the metered product exits the lower chamber portion through the bottom opening.

2. The one of a plurality of meter modules of claim 1, wherein the metering mechanism is a conveyor assembly, the conveyor assembly including a belt disposed around spaced rollers, the belt disposed to receive product entering into the meter housing portion through the top opening.

3. The one of a plurality of meter modules of claim 1, further comprising:

a flip gate pivotally disposed in the meter housing portion, the flip gate pivotally movable between a down position and an up position, whereby in the down position the metered product passes through the outlet into the lower chamber portion, and whereby in the up position, the product within the meter housing portion is retained by the flip gate and is prevented from passing through the outlet into the lower chamber portion.

4. The one of a plurality of meter modules of claim 3, wherein the flip gate is coupled to the meter by a linkage, such that reverse rotation of the meter causes the flip gate to move from the down position to the up position.

5. The one of a plurality of meter modules of claim 4, wherein the reverse rotation is a one quarter rotation of the meter.

6. The one of a plurality of meter modules of claim 1, wherein the lower chamber portion includes internal structure to direct the metered product through the lower chamber portion toward the bottom opening.

7. The one of a plurality of meter modules of claim 6, wherein the internal structure includes a funnel-structure having an open bottom end.

8. The one of a plurality of meter modules of claim 7, wherein the internal structure is movable between a dump position and a capture position, wherein in the dump position the internal structure directs the metered product toward the bottom opening, and wherein in the capture position, the internal structure closes off the open bottom end of the funnel so as to capture the metered product.

9. The one of a plurality of meter modules of claim 8, further comprising an actuator, the actuator configured to move the internal structure between the dump position and the capture position.

10. The one of a plurality of meter modules of claim 9, further comprising a load cell configured to generate a signal indicative of a mass of the metered product captured by the internal structure when in the capture position.

11. The one of a plurality of meter modules of claim 10, wherein the load cell is disposed on a bottom plate of the internal structure.

12. The one of a plurality of meter modules of claim 10, wherein the load cell supports the funnel.

13. The one of a plurality of meter modules of claim 1, further comprising:

a flow sensor disposed within the lower chamber portion, the flow sensor configured to generate a signal indicative of the metered product passing through the lower chamber portion before exiting through the bottom opening.

14. The one of a plurality of meter modules of claim 13, wherein the flow sensor is selected from the group consisting of: optical sensors, piezoelectric sensors, microphone sensors, electromagnetic energy sensors, or particle sensors.

15. The one of a plurality of meter modules of claim 9, further comprising:

a flow sensor configured to generate a signal indicative of the metered product passing through the internal structure before exiting through the bottom opening.

16. The one of a plurality of meter modules of claim 15, wherein the flow sensor is selected from the group consisting of: optical sensors, piezoelectric sensors, microphone sensors, electromagnetic energy sensors, or particle sensors.

17. The one of a plurality of meter modules of claim 16, wherein the flow sensor includes an instrumented bottom plate of the internal structure, whereby the instrumented plate detects whether product is flowing over an upper surface of the instrumented plate in the dump position.

* * * * *